(12) United States Patent
Takeda et al.

(10) Patent No.: US 11,550,144 B2
(45) Date of Patent: Jan. 10, 2023

(54) OPTICAL SCANNER UNIT AND OPTICAL APPARATUS

(71) Applicant: FUNAI ELECTRIC CO., LTD., Osaka (JP)

(72) Inventors: Futoshi Takeda, Osaka (JP); Mika Hamaoka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 176 days.

(21) Appl. No.: 17/090,903

(22) Filed: Nov. 6, 2020

(65) Prior Publication Data

US 2021/0181498 A1 Jun. 17, 2021

(30) Foreign Application Priority Data

Dec. 16, 2019 (JP) ............................. JP2019-226140

(51) Int. Cl.
*G02B 26/08* (2006.01)
*G02B 26/10* (2006.01)

(52) U.S. Cl.
CPC ......... *G02B 26/0816* (2013.01); *G02B 26/10* (2013.01)

(58) Field of Classification Search
CPC .. G02B 26/0816; G02B 26/10; G02B 26/101; G02B 26/0858; G02B 26/105; G03B 21/28; B81B 2201/04; B81B 2201/042; B81B 3/0035–0051
See application file for complete search history.

(56) References Cited

U.S. PATENT DOCUMENTS

2018/0364475 A1* 12/2018 Masuda ..................... B41J 3/00
2019/0170542 A1* 6/2019 Yang ....................... G01D 18/00

FOREIGN PATENT DOCUMENTS

| EP | 3418057 | 12/2018 |
| JP | H05045603 | 2/1993 |
| JP | H08313839 A | * 11/1996 |

* cited by examiner

*Primary Examiner* — Kimberly N. Kakalec
(74) *Attorney, Agent, or Firm* — JCIPRNET

(57) ABSTRACT

A mirror drive portion which causes a mirror portion to swing around a predetermined swing axis; a single optical sensor including a single light emission portion and a single light reception portion which receives light emitted from the light emission portion; a light blocking portion which is arranged in the mirror portion to swing together with the swing of the mirror portion and periodically blocks the light emitted from the light emission portion along with the swing; and a mirror control portion which controls the swing of the mirror portion based on an alternating voltage and a detection signal of the optical sensor, wherein the mirror control portion acquires a state of the swing of the mirror portion based on a light reception state of the light reception portion and a zero-cross timing of the alternating voltage, and controls the swing of the mirror portion.

20 Claims, 20 Drawing Sheets

[second embodiment]

[second embodiment]

[third embodiment]

[third embodiment]

OPTICAL SCANNER UNIT AND OPTICAL APPARATUS

CROSS-REFERENCE TO RELATED APPLICATION

This application claims the priority of Japan patent application serial no. 2019-0226140 filed on Dec. 16, 2019. The entirety of the above-mentioned patent application is hereby incorporated by reference herein and made a part of this specification.

BACKGROUND

Technical Field

The disclosure relates to an optical scanner unit and an optical apparatus, and particularly relates to an optical scanner unit including a vibration generation portion which causes a mirror portion to swing around a predetermined swing axis, and an optical apparatus including the optical scanner unit.

Related Art

Conventionally, an optical scanner unit which includes a vibration generation portion causing a mirror portion to swing around a predetermined swing axis is known (for example, see patent literature 1).

The aforementioned patent literature 1 discloses a resonance type scanner (optical scanner unit) including a scanner mirror (mirror portion), an actuator (vibration generation portion), an actuator drive portion, vibration detection portions, and an error detection portion. In the resonance type scanner described in the aforementioned patent literature 1, the scanner mirror is connected to the actuator via a torsion spring. The actuator drive portion resonates the scanner mirror by driving the actuator with an alternating signal near the resonance frequency of the scanner mirror. With respect to a central position of an angle range of a deflection angle of the scanner mirror (a swing angle of the scanner mirror), two vibration detection portions are arranged at different angular positions on one side (a side close to and a side far from the central position of the angle range of the swing angle), and each of the two vibration detection portions independently detects the vibration position (the swing angle) of the scanner mirror. The error detection portion calculates an error signal for keeping amplitude of the scanner mirror constant by comparing a detection signal corresponding to a difference between detection outputs of the respective vibration detection portions and a preset predetermined signal. Then, the actuator drive portion is driven based on the calculated error signal.

LITERATURE OF RELATED ART

Patent Literature

[Patent literature 1] Japanese Patent Laid-open No. 5-45603

However, the resonance type scanner (the optical scanner unit) of the aforementioned patent literature 1 is configured to detect the swing angle of the scanner mirror by the two vibration detection portions. Therefore, there is a problem that the number of components increases and the device configuration becomes complicated.

SUMMARY

An optical scanner unit in a first aspect of the disclosure includes: a mirror portion including a reflection part which reflects light; a vibration generation portion which causes the mirror portion to swing around a predetermined swing axis by applying an alternating voltage; a single optical sensor including a single light emission portion and a single light reception portion which receives light emitted from the light emission portion; a light blocking portion which is arranged in the mirror portion to swing together with the swing of the mirror portion and periodically blocks the light emitted from the light emission portion along with the swing; and a control portion which controls the swing of the mirror portion based on the alternating voltage and a detection signal of the optical sensor, wherein the control portion acquires a state of the swing of the mirror portion based on a light reception state of the light reception portion and a zero-cross timing of the alternating voltage, and controls the swing of the mirror portion.

The optical scanner unit according to the first aspect of the disclosure includes, as described above, the single optical sensor including the single light emission portion and the single light reception portion, and the control portion which acquires the state of the swing of the mirror portion based on the light reception state of the light reception portion and the zero-cross timing of the alternating voltage, and controls the swing of the mirror portion. Here, the vibration generation portion generates vibration by applying the alternating current and causes the mirror portion to swing due to a resonance phenomenon. Therefore, when the mirror portion swings normally, an alternating voltage signal and a swing signal of the mirror portion are in a state of being deviated from each other by 90 degrees. That is, at a point where a value of the alternating voltage signal becomes zero (zero cross), the mirror portion is positioned at a swing end. In addition, when a point where the alternating voltage signal becomes zero from a negative side is zero cross, the mirror portion is assumed to swing to the negative side at a timing when the zero cross is detected. In addition, when a point where the alternating voltage signal becomes zero from a positive side is zero cross, the mirror portion is assumed to swing to the positive side at a timing when the zero cross is detected. By defining in this way, a swing direction of the mirror portion can be detected according to the zero-cross timing. Thus, with the above configuration, the swing direction of the mirror portion can be detected according to the light reception state of the light reception portion and the zero-cross timing of the alternating voltage. Thus, even when the state of the swing of the mirror portion is detected by the single optical sensor including the single light emission portion and the single light reception portion, the swing direction of the mirror portion can be detected, and thus, the swing of the mirror portion can be controlled. As a result, the optical scanner unit capable of suppressing an increase in the number of components and complication of the device configuration can be provided.

DESCRIPTION OF THE EMBODIMENTS

Figure 1:
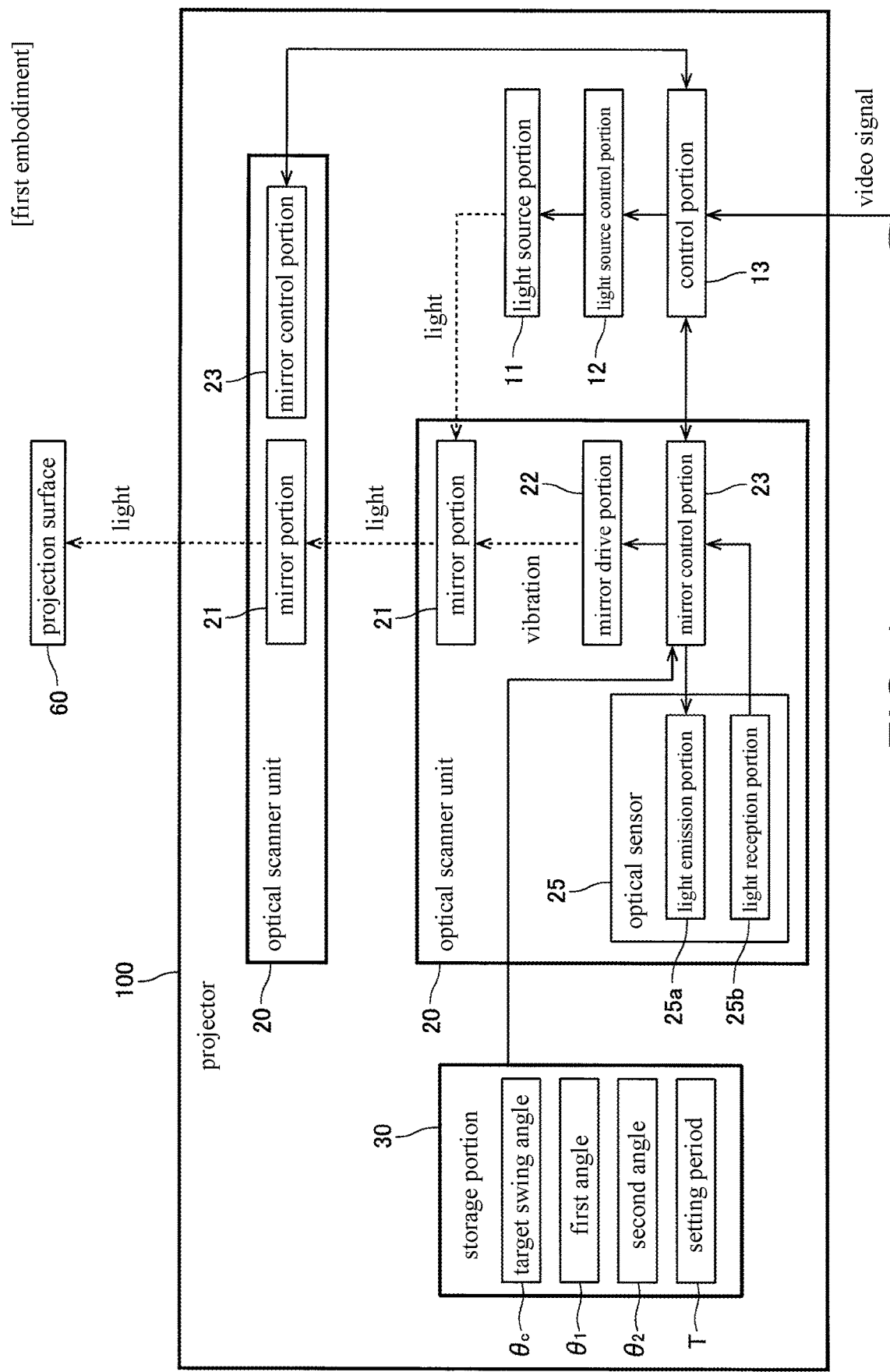
FIG. 1 is a block diagram showing an overall configuration of a projector according to a first embodiment.

The disclosure provides an optical scanner unit and an optical apparatus capable of suppressing an increase in the number of components and complication of the device configuration.

In the optical scanner unit according to the aforementioned first aspect, the control portion acquires the state of the swing of the mirror portion based on a first light reception section, a second light reception section, and the zero-cross timing, and controls the swing of the mirror portion, wherein the first light reception section is a section in which the light blocking portion swings not to block the light reception portion on one swing angle side, and the second light reception section is a section in which the light blocking portion swings not to block the light reception portion on the other swing angle side. Here, the swing direction of the mirror portion can be detected according to the zero-cross timing. In addition, the swing angle of the mirror portion can be acquired according to a signal which is detected by the optical sensor while the light blocking portion is swinging in the first light reception section and a signal which is detected by the optical sensor while the light blocking portion is swinging in the second light reception section. Thus, with the above configuration, the state of the swing of the mirror portion can be easily acquired by acquiring the first light reception section, the second light reception section, and the zero-cross timing. As a result, because the state of the swing of the mirror portion can be easily acquired, the swing of the mirror portion can be easily controlled.

In this case, the control portion acquires a first light reception time and a second light reception time, and controls the swing of the mirror portion based on the acquired first light reception time, the acquired second light reception time, and a predetermined target swing angle, wherein the first light reception time is a time length during which the light blocking portion swings in the first light reception section, and the second light reception time is a time length during which the light blocking portion swings in the second light reception section. With this configuration, the swing angle of the mirror portion can be acquired according to the first light reception time and the second light reception time. As a result, the swing of the mirror portion can be easily feedback-controlled by comparing the acquired swing angle of the mirror portion and the target swing angle.

In the configuration in which the swing of the mirror portion is controlled based on the first light reception time, the second light reception time, and the target swing angle, the control portion acquires the first light reception time based on a timing of switching from a light blocking section to the first light reception section and a timing of switching from the first light reception section to the light blocking section, and the control portion acquires the second light reception time based on a timing of switching from the light blocking section to the second light reception section and a timing of switching from the second light reception section to the light blocking section, wherein the light blocking section is a section in which the light blocking portion swings to block the light reception portion. With this configuration, the first light reception time can be easily acquired by acquiring the timing of switching from the light blocking section to the first light reception section and the timing of switching from the first light reception section to the light blocking section. In addition, the second light reception time can be easily acquired by acquiring the timing of switching from the light blocking section to the second light reception section and the timing of switching from the second light reception section to the light blocking section.

In the configuration in which the swing of the mirror portion is controlled based on the first light reception time, the second light reception time, and the target swing angle, the control portion acquires a first angle based on the first light reception time, acquires a second angle based on the second light reception time, acquires a swing angle of the mirror portion according to the acquired first angle, the acquired second angle, the first light reception time, and the second light reception time, and controls the swing angle of the mirror portion by comparing the acquired swing angle of the mirror portion with the predetermined target swing angle, wherein the first angle is a swing angle of the light blocking portion at a timing when the first light reception section and the light blocking section are switched, and the second angle is a swing angle of the light blocking portion at a timing when the second light reception section and the light blocking section are switched. With this configuration, by using PID control (feedback control of combining proportional control, differential control, and integration control with respect to an input value to bring an output value closer to a target value) or the like of feeding back a value of an actual swing angle of a mirror portion and controlling the swing angle of the mirror portion to become the target swing angle, the alternating voltage can be controlled, and the swing angle of the mirror portion can be easily set to the target swing angle.

In the configuration in which the swing of the mirror portion is controlled based on the first light reception time, the second light reception time, and the target swing angle, the control portion acquires a first light blocking time and a second light blocking time, acquires a light blocking time based on the acquired first light blocking time and the acquired second light blocking time, and controls the swing of the mirror portion by comparing the acquired light blocking time and a target light blocking time, wherein the first light blocking time is a time length during which the light blocking portion passes through the light blocking section by swinging toward the other swing angle side, the second light blocking time is a time length during which the light blocking portion passes through the light blocking section by swinging toward the one swing angle side, the light blocking time is a time length during which the light blocking portion blocks light for the light reception portion, and the target light blocking time is a time length during which the light blocking portion blocks light for the light reception portion when the mirror portion is swung by the predetermined target swing angle. With this configuration, if a swing period of the mirror portion is constant, the swing of the mirror portion can be controlled by acquiring the light blocking times. As a result, compared with a configuration in which the swing angle of the mirror portion is acquired and is compared with the target swing angle, the processing load of the control portion when controlling the swing of the mirror portion can be reduced.

In the configuration in which the swing of the mirror portion is controlled based on the first light reception time, the second light reception time, and the target swing angle, the control portion detects whether the swing of the mirror portion is normal based on the first light reception section, the second light reception section, and the zero-cross timing. With this configuration, when the swing of the mirror portion is not normal, for example, it is possible to avoid controlling the swing of the mirror portion by using abnormal parameters, for example, processing in a manner of maintaining the previous voltage value without changing the value of the alternating voltage. In addition, when the swing of the mirror portion is normal, the mirror portion can be swung by the target swing angle by controlling the swing of the mirror portion using the acquired parameters.

In this case, the control portion determines that the swing of the mirror portion is normal when the zero-cross timing is included in the second light reception section, and determines that the swing of the mirror portion is abnormal when the zero-cross timing is included in the first light reception section. With this configuration, the state of the swing of the mirror portion can be easily determined by acquiring the zero-cross timing and a light reception section at that time.

In the configuration in which the swing of the mirror portion is controlled based on the first light reception time, the second light reception time, and the target swing angle, the control portion controls the swing of the mirror portion for each period based on the first light reception time, the second light reception time, and the predetermined target swing angle. With this configuration, the swing of the mirror portion can be controlled for each period, and thus, for example, compared with a configuration in which the swing of the mirror portion is controlled every several periods, the swing of the mirror portion can be controlled more precisely.

In the configuration in which the swing of the mirror portion is controlled based on the first light reception time, the second light reception time, and the target swing angle, the control portion controls the swing of the mirror portion for each half period based on the first light reception time or the second light reception time and the predetermined target swing angle. With this configuration, the swing of the mirror portion can be controlled for each half period, and thus, for example, compared with the configuration in which the swing of the mirror portion is controlled for each period, the swing of the mirror portion can be controlled more precisely.

In this case, the control portion controls the swing of the mirror portion for each half period based on the predetermined target swing angle, a third light reception time, and a sixth light reception time, or based on the predetermined target swing angle, a fourth light reception time, and a fifth light reception time, wherein the third light reception time is a time length of reaching a first swing end that is a swing end on the one swing angle side after switching from the light blocking section to the first light reception section, the fourth light reception time is a time length until switching from the first swing end to the light blocking section, the fifth light reception time is a time length of reaching a second swing end that is a swing end on the other swing angle side after switching from the light blocking section to the second light reception section, and the sixth light reception time is a time length until switching from the second swing end to the light blocking section. With this configuration, the swing of the mirror portion can be easily controlled by acquiring the third light reception time, the fourth light reception time, the fifth light reception time, and the sixth light reception time.

In the optical scanner unit according to the aforementioned first aspect, the light reception portion is arranged at a position overlapping a position where the swing angle of the light blocking portion is 0 degree when the alternating voltage is not applied. With this configuration, the light reception portion can be arranged at a position which is a center of the swing range of the light blocking portion. As a result, because the light reception portion is arranged at the position which is the center of the swing angle of the light blocking portion, deviation of the central position of the swing angle of the light blocking portion can be easily acquired by comparing the first light reception time and the second light reception time.

The optical scanner unit according to the aforementioned first aspect further includes a cover member arranged to cover the optical sensor. With this configuration, in the optical sensor covered by the cover member, disturbance light such as stray light (unnecessary reflected light) generated in the optical scanner unit, light incident from the outside of the optical scanner unit, or the like is suppressed from being incident, and thus, detection precision of the swing angle of the mirror portion based on the light incident on the light reception portion can be prevented from decreasing due to the disturbance light.

The optical scanner unit according to the aforementioned first aspect further includes a filter member which is arranged in the vicinity of the light reception portion in a manner that light incident on the light reception portion passes through the filter member, and enables light in a wavelength region corresponding to the light emitted by the light emission portion to pass through. With this configuration, in the light reception portion equipped with the filter member in the vicinity, light other than the wavelength region corresponding to the light emitted by the light emission portion is prevented from being incident, and thus, the detection precision of the swing angle of the mirror portion based on the light incident on the light reception portion can be prevented from decreasing due to the disturbance light such as stray light (unnecessary reflected light) generated in the optical scanner unit, light incident from the outside of the optical scanner unit, or the like. Moreover, the vicinity of the light reception portion means to include both the position itself of the light reception portion and neighborhood of the position of the light reception portion.

In the optical scanner unit according to the aforementioned first aspect, the optical sensor is arranged between the mirror portion and the vibration generation portion. With this configuration, when the mirror portion and the vibration generation portion are fixed to other members such as a base member or the like at corners or an outer periphery in order to stabilize the swing of the mirror portion, compared with a case where the optical sensor is arranged on a side of the mirror portion opposite to the vibration generation portion, a side of the vibration generation portion opposite to the mirror portion, or the like, the optical sensor can be arranged at a position distant from the position (the corner or the outer periphery) where the mirror portion and the vibration generation portion are fixed. As a result, the optical sensor can be prevented from vibrating due to propagation of the vibration generated by the vibration generation portion to the optical sensor, and thus, the detection precision of the swing angle of the mirror portion based on the light incident on the light reception portion of the optical sensor can be prevented from decreasing.

In the optical scanner unit according to the aforementioned first aspect, the light blocking portion protrudes from the mirror portion toward the optical sensor side along a surface direction in which a surface of the reflection part extends, and the light blocking portion has a thickness smaller than a thickness of the mirror portion in a direction orthogonal to the direction in which the surface extends. With this configuration, the thickness of the light blocking portion is smaller than the thickness of the mirror portion, and thus, a mass of the light blocking portion can be prevented from increasing. Thus, a mass of a swing part including the mirror portion and the light blocking portion can be prevented from increasing due to the increase in the mass of the light blocking portion which protrudes from the mirror portion toward the optical sensor side. As a result, decrease in a resonance frequency of the aforementioned swing part, deviation of a center-of-gravity position of the swing part, and the like can be prevented from occurring as the mass of the swing part is increased.

An optical apparatus in a second aspect of the disclosure includes: the optical scanner unit in the aforementioned first aspect; and a light source portion which irradiates scanning light to the reflection part of the mirror portion equipped in the optical scanner unit.

In the optical apparatus according to the second aspect of the disclosure, an optical scanner unit is arranged which includes, as described above, the single optical sensor including the single light emission portion and the single light reception portion, and the control portion which acquires the state of the swing of the mirror portion based on the light reception state of the light reception portion and the zero-cross timing of the alternating voltage, and controls the swing of the mirror portion. Thereby, similar to the optical scanner unit in the aforementioned first aspect, an optical apparatus capable of suppressing an increase in the number of components and complication of the device configuration can be provided.

According to the disclosure, as described above, the optical scanner unit and the optical apparatus capable of suppressing an increase in the number of components and complication of the device configuration can be provided.

Embodiments embodying the disclosure are described below with reference to the drawings.

First Embodiment

A configuration of a projector 100 according to a first embodiment is described with reference to FIGS. 1 to 10. Moreover, the projector 100 is an example of an "optical apparatus" in the claims.

As shown in FIG. 1, the projector 100 includes a light source portion 11, a light source control portion 12, a control portion 13, an optical scanner unit 20, and a storage unit 30. The projector 100 projects laser light onto a projection surface 60 to project an image.

The light source portion 11 outputs the laser light. Specifically, the light source portion 11 irradiates blue laser light, red laser light, and green laser light respectively to a mirror portion 21 included in the optical scanner unit 20 via a beam splitter or a lens.

The light source control portion 12 controls the irradiation of the laser light performed by the light source portion 11 based on control performed by the control portion 13. Specifically, the light source control portion 12 is controlled by the control portion 13 to thereby control timing of each of the blue laser light, the red laser light, and the green laser light irradiated from the light source portion 11.

The control portion 13 controls each portion of the projector 100. The control portion 13 acquires a video signal to be projected on the projection surface 60 from the outside. The control portion 13 controls the irradiation of the laser light performed by the light source portion 11 via the light source control portion 12 based on the acquired video signal. The control portion 13 includes, for example, a central processing unit (CPU).

The optical scanner unit 20 causes the mirror portion 21 to swing and causes the laser light irradiated from the light source portion 11 to be reflected by the mirror portion 21 so as to be projected on the projection surface 60. That is, the optical scanner unit 20 scans scanning laser light irradiated from the light source portion 11 at a predetermined scanning angle. Moreover, in the projector 100, two optical scanner units 20 whose scanning directions are orthogonal to each other are used to scan the laser light in horizontal and vertical directions of the image. Moreover, the two optical scanner units 20 have substantially the same configuration, but in FIG. 1, the configuration of one of the two optical scanner units 20 is simplified.

The optical scanner unit 20 includes the mirror portion 21, a mirror drive portion 22, a mirror control portion 23, a metal member 24 (see FIG. 2), an optical sensor 25, a base member 26, and a light blocking portion 27. In the optical scanner unit 20, the mirror drive portion 22, the optical sensor 25, and the mirror portion 21 are arranged side by side in this order from a Y1 side to a Y2 side in a Y-direction. That is, in the first embodiment, the optical sensor 25 is arranged between the mirror portion 21 and the mirror drive portion 22. Moreover, in the first embodiment, the optical scanner unit 20 includes a single optical sensor 25. In addition, the mirror drive portion 22 is an example of a "vibration generation portion" in the claims. In addition, the mirror control portion 23 is an example of a "control portion" in the claims.

The mirror portion 21 reflects the light irradiated from the light source portion 11. Details of a configuration of the mirror portion 21 are described later.

The mirror drive portion 22 causes the mirror portion 21 to swing around a predetermined swing axis 90 (see FIG. 4) by applying an alternating voltage. Details of the configuration in which the mirror drive portion 22 causes the mirror portion 21 to swing are described later.

The mirror control portion 23 controls each portion of the optical scanner unit 20. The mirror control portion 23 controls the drive of the mirror portion 21 by the mirror drive portion 22 based on the control of the control portion 13. The mirror control portion 23 includes, for example, a CPU and the like.

The metal member 24 propagates vibration generated in the mirror drive portion 22 to the mirror portion 21. A specific configuration of the metal member 24 is described later.

The optical sensor 25 includes a single light emission portion 25a and a single light reception portion 25b. In the optical sensor 25, the light emission portion 25a and the light reception portion 25b are arranged to face each other. The optical sensor 25 determines the presence or the position of an object by the light reception portion 25b detecting that the light emitted from the light emission portion 25a is blocked by the object. The optical sensor 25 is a so-called photo interrupter. Besides, a detection signal 43 (see FIG. 10) based on a detection result of the light reception portion 25b is sent to the mirror control portion 23.

Figure 2:
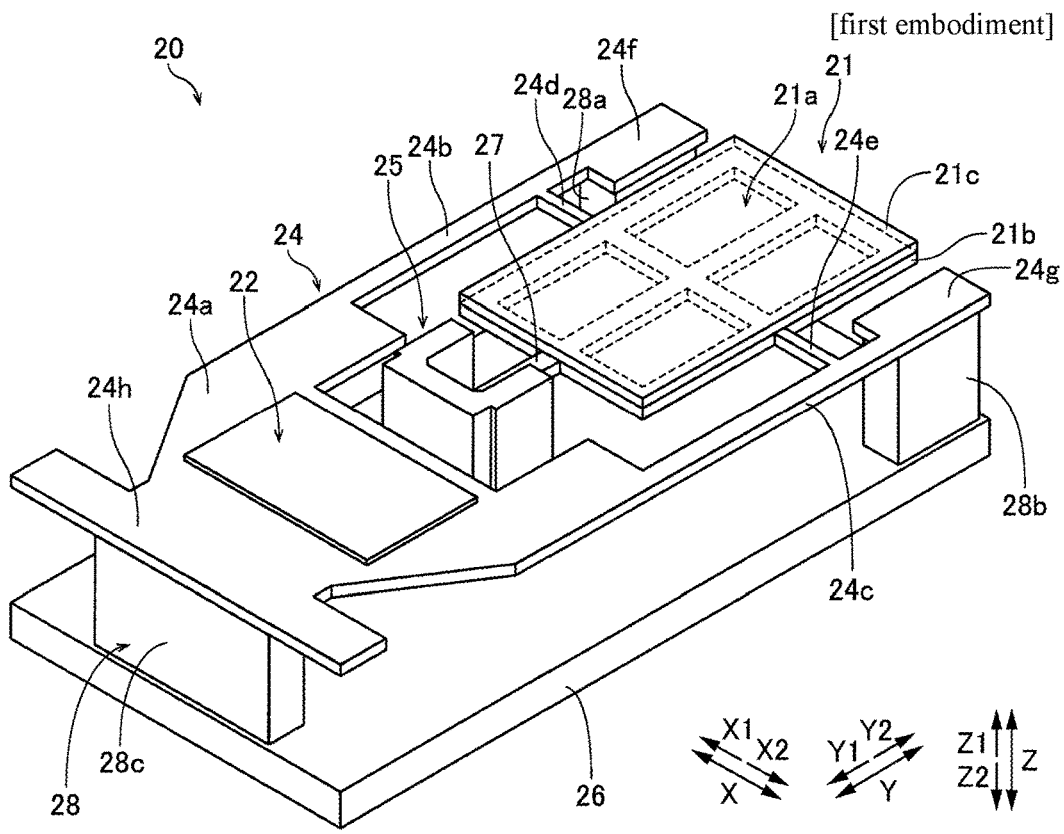
FIG. 2 is a perspective view of an optical scanner unit according to the first embodiment.

As shown in FIG. 2, the mirror portion 21 includes a mirror substrate 21a that reflects light and a mirror substrate support portion 21b that supports the mirror substrate 21a. The mirror substrate 21a and the mirror substrate support portion 21b are respectively arranged on an upper side (Z1 side) and a lower side (Z2 side) of the mirror portion 21. The mirror substrate 21a and the mirror substrate support portion 21b are fixed to each other with an adhesive or the like. Moreover, the mirror substrate 21a is an example of a "reflection part" in the claims.

The mirror substrate 21a is formed in a flat plate shape. The mirror substrate 21a is made of glass. An aluminum film is formed on a surface 21c of the mirror substrate 21a which reflects light. In a direction in which the surface 21c of the mirror substrate 21a which reflects light extends, a size of the mirror substrate support portion 21b is substantially the same as a size of the mirror substrate 21a. In addition, as shown by a broken line in FIG. 2, the mirror substrate support portion 21b is formed in a lattice shape.

In addition, as shown in FIG. 2, the metal member 24 includes a drive part support portion 24a, two beam portions 24b and 24c, and two hinge portions 24d and 24e. The metal member 24 is formed in a plate shape extending along an XY plane. The metal member 24 is made of high-strength stainless steel having high tensile strength, special metal, or the like. Moreover, the mirror substrate support portion 21b of the mirror portion 21 is formed integrally with the metal member 24. That is, the mirror substrate support portion 21b of the mirror portion 21 is a part of the metal member 24.

Figure 3:
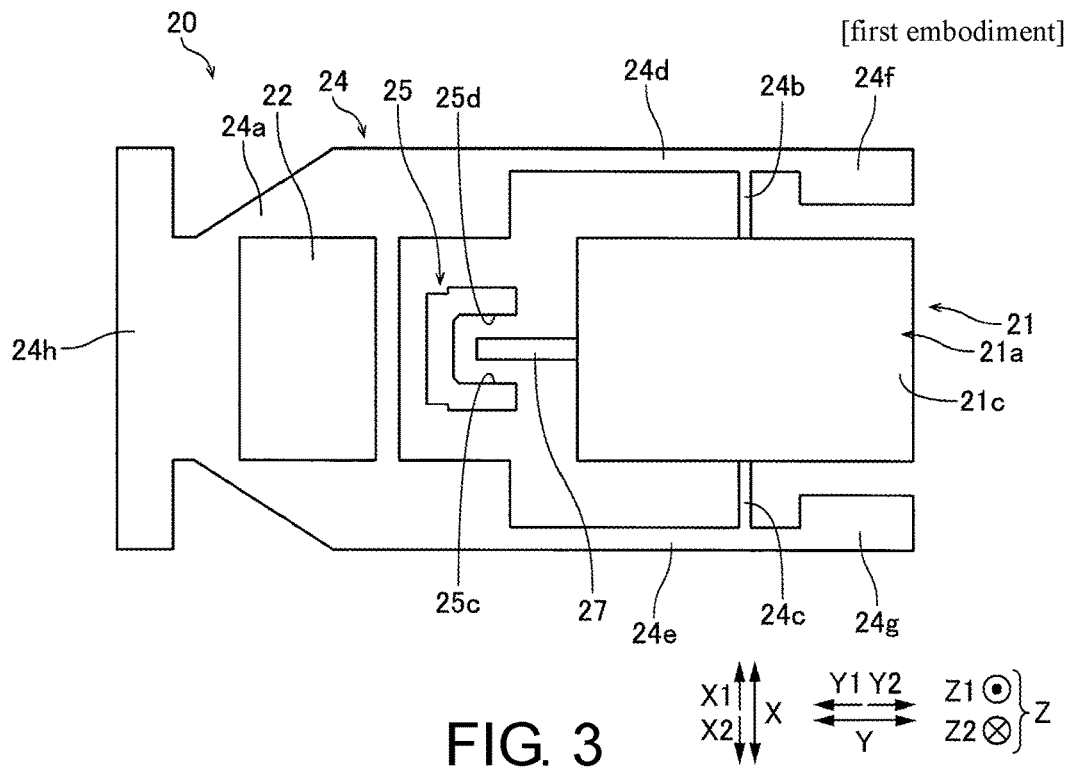
FIG. 3 is a plan view of the optical scanner unit according to the first embodiment.

The drive part support portion 24a is arranged at a lower side (Z2 side) of the mirror drive portion 22 to support the mirror drive portion 22. As shown in FIG. 3, the drive part support portion 24a has a substantially trapezoidal shape when viewed from a Z-direction. The drive part support portion 24a is formed to be larger than the mirror drive portion 22 when viewed from the Z-direction.

Each of the two beam portions 24b and 24c is formed to be smaller in size in the X-direction than the drive part support portion 24a when viewed from the Z-direction. The beam portion 24b is arranged to extend in a Y2-direction from a Y2 side of the drive part support portion 24a and an end on an X1 side. The beam portion 24c is arranged to extend in the Y2-direction from a Y2 side of the drive part support portion 24a and an end on an X2 side.

The two hinge portions 24d and 24e are respectively arranged on an X2 side of the beam portion 24b and an X1 side of the beam portion 24c. The hinge portion 24d is arranged in a manner of extending from the beam portion 24b toward the X2 side to be connected to a central position of the mirror substrate support portion 21b in the Y-direction. The hinge portion 24e is arranged in a manner of extending from the beam portion 24c toward the X1 side to be connected to the central position of the mirror substrate support portion 21b in the Y-direction. The two hinge portions 24d and 24e are torsionally deformable when vibration is propagated. Thus, the vibration of the mirror drive portion 22 is propagated to the two hinge portions 24d and 24e via the mirror substrate support portion 21b and the two beam portions 24b and 24c of the metal member 24, and thereby the mirror portion 21 connected to the two hinge portions 24d and 24e can be swung. Moreover, a central unit of a cross-section of the two hinge portions 24d and 24e serves as the swing axis 90 when the mirror portion 21 swings.

In addition, as shown in FIG. 2, the base member 26 is arranged at the lower side (Z2 side) of the metal member 24. The base member 26 is formed in a plate shape to extend on the XY plane. The metal member 24 is fixed to the base member 26 at three fixed positions of a fixed portion 24f, a fixed portion 24g, and a fixed portion 24h via metal support members 28 extending in the Z-direction. The metal support member 28 may be arranged integrally with the base member 26, or may be arranged separately from the base member 26. The fixed portion 24f and the fixed portion 24g are arranged respectively on the Y2 side of the beam portion 24b and the beam portion 24c. The fixed portion 24f and the fixed portion 24g each have a length larger than that of the beam portion 24b and the beam portion 24c in the X-direction. A metal support member 28a for fixing the fixed portion 24f to the base member 26 and a metal support member 28b for fixing the fixed portion 24g to the base member 26 are respectively arranged substantially in the centers of the fixed portion 24f and the fixed portion 24g when viewed from the Z-direction. The metal support member 28a and the metal support member 28b respectively have substantially the same size as that of the fixed portion 24f and the fixed portion 24g when viewed from the Z-direction. The fixed portion 24h is arranged on the Y1 side of the drive part support portion 24a. A metal support member 28c for fixing the fixed portion 24h to the base member 26 has a size substantially the same as that of the fixed portion 24h in the Y-direction and a size smaller than that of the fixed portion 24h in the X-direction. The metal support member 28c is arranged substantially in the center of the fixed portion 24h in the X-direction when viewed from the Z-direction. The fixed portions (24f, 24g and 24h) and the metal support members 28 (28a, 28b and 28c) are fixed by a fixing method such as a vis, a bolt, a screw, an adhesive, welding, or the like.

The light blocking portion 27 protrudes from the mirror portion 21 toward the optical sensor 25 side (the Y1 side) along a surface direction in which the surface 21c of the mirror substrate 21a which reflects light extends. Specifically, the light blocking portion 27 is arranged to protrude from a central position in the X-direction on the optical sensor 25 side of the mirror substrate support portion 21b toward the Y1 side. Moreover, the light blocking portion 27 is formed integrally with the mirror substrate support portion 21b.

As shown in FIG. 3, the optical sensor 25 is formed in a substantially U shape that opens to the Y2 side when viewed from the Z-direction. Although not shown in FIG. 3, the light emission portion 25a and the light reception portion 25b are respectively arranged on a surface 25c on the X2 side and a surface 25d on the X1 side on the inner side of the optical sensor 25 which is formed in a substantially U shape. The light emission portion 25a is, for example, a light emission diode (LED). In addition, the light reception portion 25b is, for example, a phototransistor.

Figure 4:
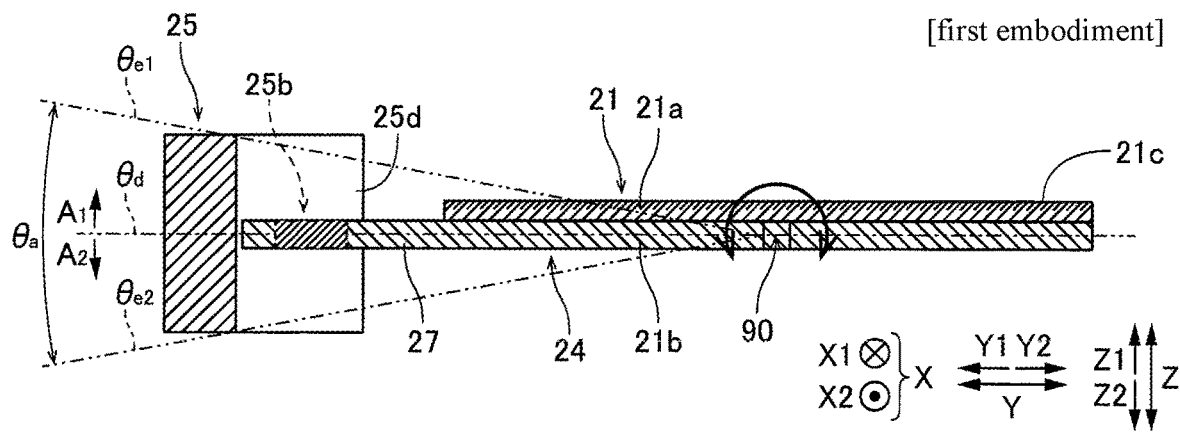
FIG. 4 is a diagram showing a state in which a light blocking portion of the optical scanner unit according to the first embodiment is positioned at a central position in a swing angle range.
Figure 5:
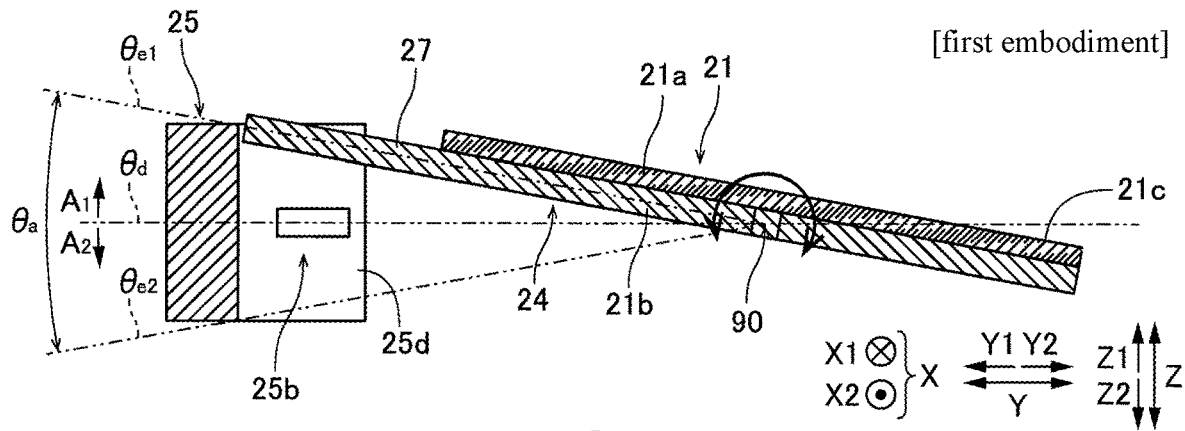
FIG. 5 is a diagram showing a state in which the light blocking portion of the optical scanner unit according to the first embodiment is positioned on one swing angle side of the swing angle range.
Figure 6:
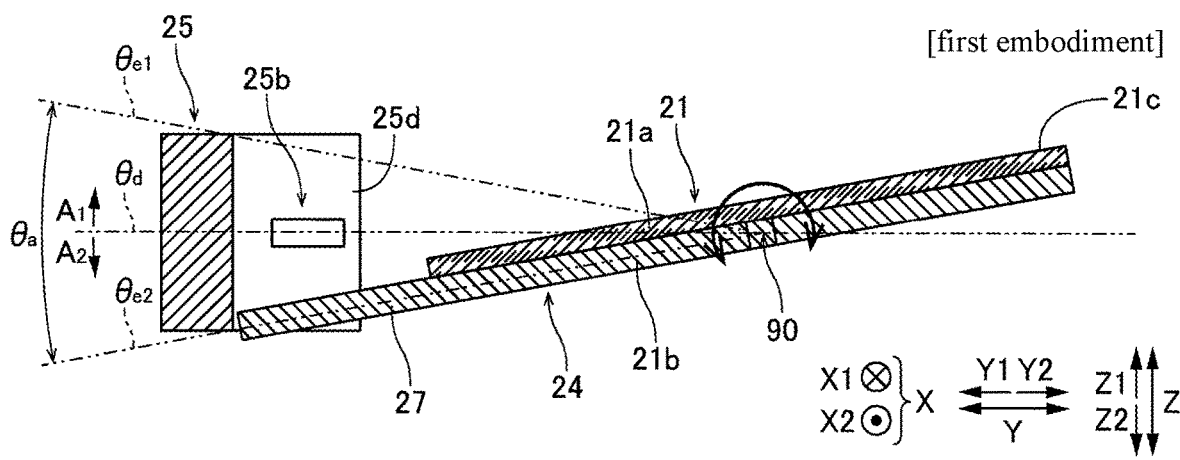
FIG. 6 is a diagram showing a state in which the light blocking portion of the optical scanner unit according to the first embodiment is positioned on the other swing angle side of the swing angle range.

As shown in FIGS. 4 to 6, the light blocking portion 27 is arranged in the mirror portion 21 to swing together with the swing of the mirror portion 21 and periodically blocks the light emitted from the light emission portion 25a along with the swing of the mirror portion 21. Specifically, the mirror control portion 23 controls the mirror portion 21 to swing in order that the light blocking portion 27 straddles the light reception portion 25b. Besides, the mirror portion 21 swings around the swing axis 90, and thereby the light blocking portion 27 arranged in the mirror portion 21 is in a state of covering the light reception portion 25b (a state of FIG. 4) or the light blocking portion 27 arranged in the mirror portion 21 is in a state of not covering the light reception portion 25b (a state of FIGS. 5 and 6). Moreover, in the examples shown in FIGS. 4 to 6, the light blocking portion 27 swings between a swing end $\theta_{e1}$ of one swing angle side $A_1$ and a swing end $\theta_{e2}$ of the other swing angle side $A_2$. That is, a swing angle $\theta_a$ is an angle between the swing end $\theta_{e1}$ of the one swing angle side $A_1$ and the swing end $\theta_{e2}$ of the other swing angle side $A_2$.

In the first embodiment, the light reception portion 25b is arranged at a central position $\theta_d$ of the swing range of the light blocking portion 27. Specifically, as shown in FIG. 4, the light reception portion 25b is arranged at a position overlapping a position where the swing angle of the light blocking portion 27 is 0 degree when the alternating voltage is not applied. Moreover, the position where the swing angle of the light blocking portion 27 is 0 degree when the alternating voltage is not applied is the position where the light blocking portion 27 is arranged at the central position $\theta_d$.

Figure 7:
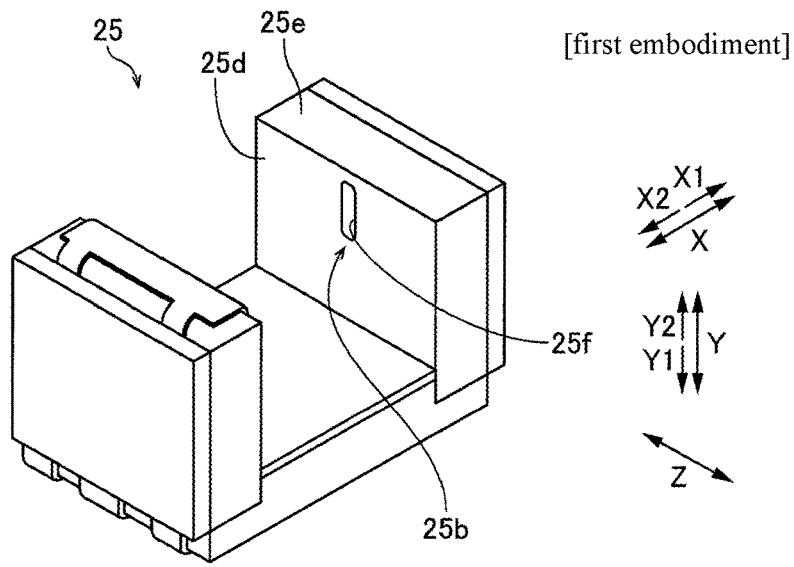
FIG. 7 is a perspective view of an optical sensor of the optical scanner unit according to the first embodiment.

As shown in FIG. 7, the optical scanner unit 20 is equipped with a slit member 25e to cover the light reception portion 25b. A slit (opening) 25f is formed in the slit member 25e. Thus, light that passes through the slit 25f of the slit member 25e is received in the light reception portion 25b. Moreover, the optical sensor 25 is fixed to the base member 26 (see FIG. 2) arranged on a lower side (Z2 side) of the optical sensor 25.

Figure 8:
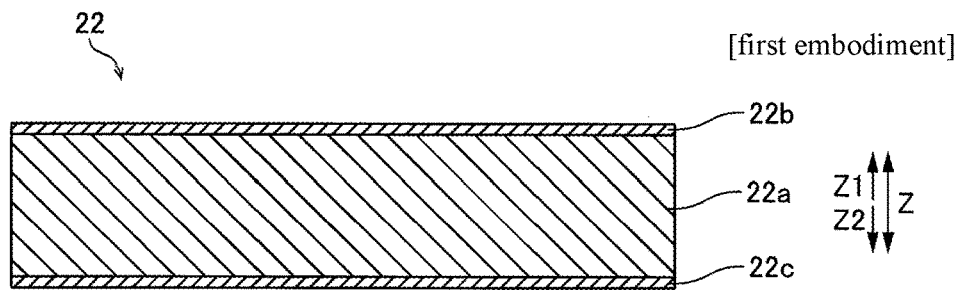
FIG. 8 is a cross-sectional view of a mirror drive portion of the optical scanner unit according to the first embodiment.

As shown in FIG. 8, the mirror drive portion 22 includes a piezoelectric body 22a, an upper electrode 22b, and a lower electrode 22c. The piezoelectric body 22a is made of lead zirconate titanate (PZT), which is a dielectric (ferroelectric). The upper electrode 22b and the lower electrode 22c are respectively arranged on an upper side (Z1 side) and a lower side (Z2 side) of the piezoelectric body 22a. Each of the upper electrode 22b and the lower electrode 22c is mechanically and electrically connected to the piezoelectric body 22a by a conductive adhesive. The piezoelectric body 22a is polarized in a thickness direction (Z-direction), and when a voltage is applied, the upper side (Z1 side) or the lower side (Z2 side) expands and deforms in the X-direction depending on the polarity. Thereby, when the alternating voltage is applied to the mirror drive portion 22, the piezoelectric body 22a vibrates at a vibration frequency corresponding to a frequency of the alternating voltage. Then, the vibration generated in the mirror drive portion 22 is propagated to the mirror portion 21 via the metal member 24, and thereby the mirror portion 21 swings around the predetermined swing axis 90.

Figure 9:
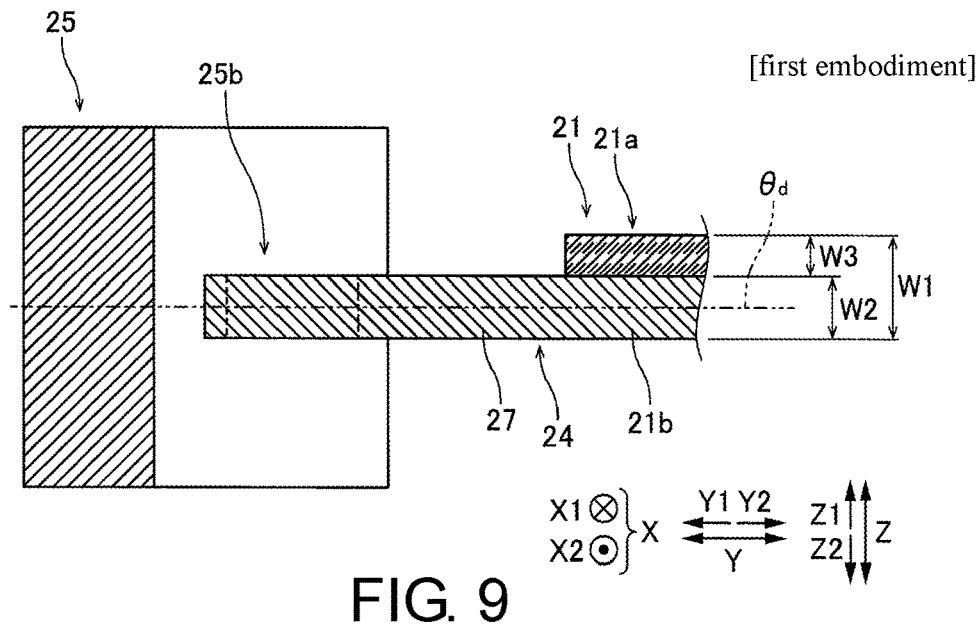
FIG. 9 is a diagram for illustrating a width of the light blocking portion with respect to a mirror portion of the optical scanner unit according to the first embodiment.

In addition, as shown in FIG. 9, in the first embodiment, the light blocking portion 27 has a thickness W2 smaller than a thickness W1 of the mirror portion 21 in the direction orthogonal to the direction in which the surface 21c of the mirror substrate 21a which reflects light extends. Specifically, when viewed from the X-direction, the thickness W1 of the mirror portion 21 is a total of a thickness W3 of the mirror substrate 21a and the thickness W2 of the mirror substrate support portion 21b. On the other hand, the thickness W2 of the light blocking portion 27 is equal to the thickness W2 of the mirror substrate support portion 21b. Thus, the thickness W2 of the light blocking portion 27 is smaller than the thickness W1 of the mirror portion 21 by the thickness W3 of the mirror substrate 21a.

(Swing Signal, Drive Signal, Zero-Cross Signal, and Detection Signal)

Next, a swing signal 40 when the mirror portion 21 swings, an alternating voltage signal 41 applied to the mirror drive portion 22, a zero-cross signal 42, and the detection signal 43 detected by the optical sensor 25 are described with reference to FIG. 10.

In the mirror control portion 23 (see FIG. 1), the mirror portion 21 is swung in order that the light blocking portion 27 straddles the light reception portion 25b between the one swing angle side $A_1$ and the other swing angle side $A_2$ in the range of the swing angle $\theta_a$. Specifically, as shown in a graph G1 of FIG. 10, when the swing angle and time of the mirror portion 21 (the light blocking portion 27) are respectively a vertical axis and a horizontal axis, the state in which the mirror portion 21 (the light blocking portion 27) is swung can be represented by the swing signal 40 having a sinusoidal waveform shape.

Moreover, in the graph G1, a first light reception section Se1 is a section in which the light blocking portion 27 swings not to block the light reception portion 25b on the one swing angle side $A_1$. In addition, a second light reception section Se2 is a section in which the light blocking portion 27 swings not to block the light reception portion 25b on the other swing angle side $A_2$. In addition, a light blocking section Se3 is a section in which the light blocking portion 27 swings to block the light reception portion 25b.

In addition, the alternating voltage is applied to the mirror drive portion 22. That is, as shown in a graph G2 of FIG. 10, the alternating voltage signal 41 can be represented by a signal having a sinusoidal waveform shape. Moreover, in the graph G2, a vertical axis represents voltage intensity and a horizontal axis represents time.

Moreover, the mirror drive portion 22 causes the mirror portion 21 to swing due to the resonance phenomenon. Thus, the alternating voltage signal 41 and the swing signal 40 deviate by a half period (90 degrees).

Figure 10:
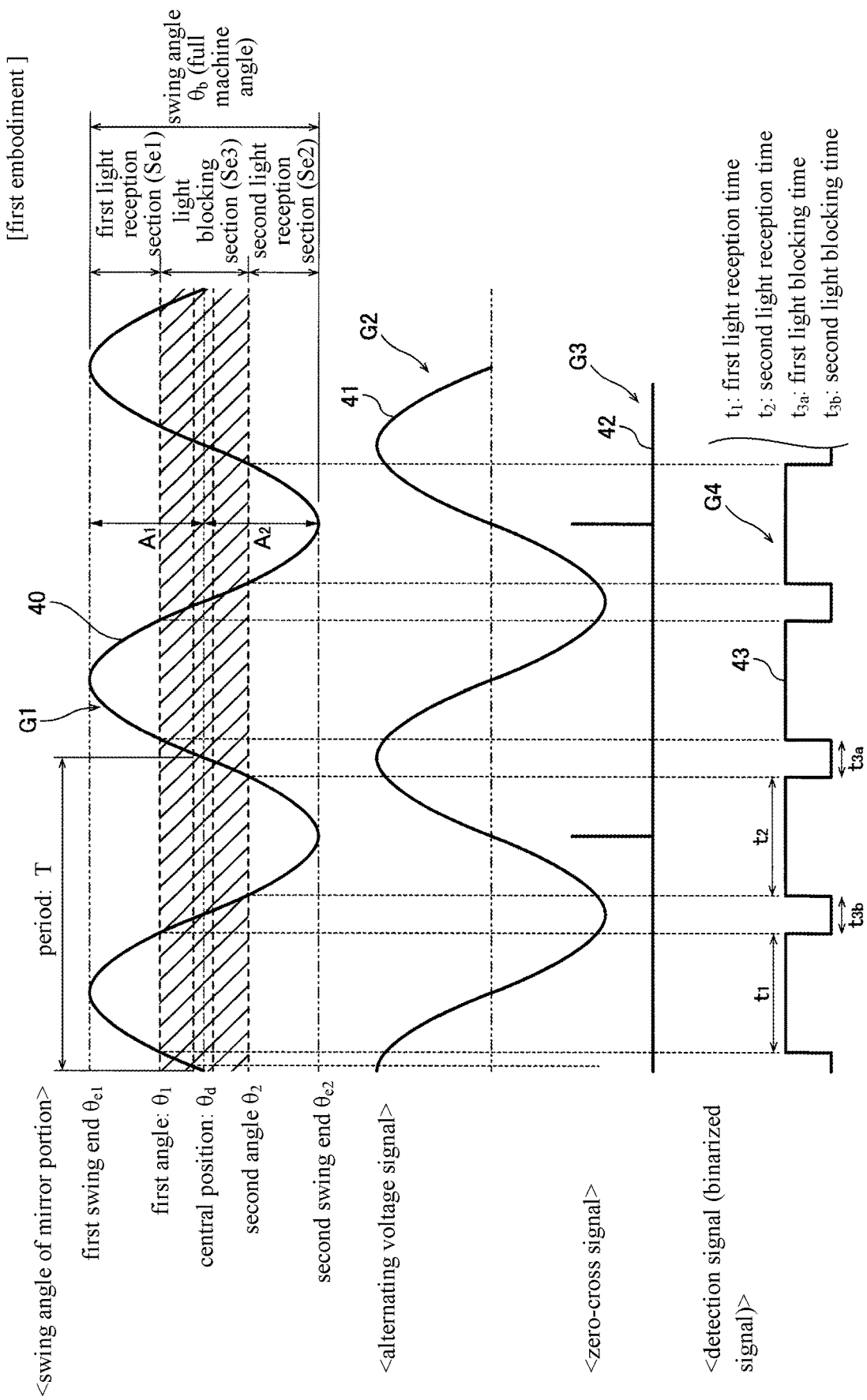
FIG. 10 is a diagram for illustrating a swing angle of a mirror, an alternating voltage signal, a zero-cross signal, and a detection signal of the optical scanner unit according to the first embodiment.

In addition, a graph G3 shown in FIG. 10 is a graph showing the zero-cross signal 42. In the graph G3, a vertical axis represents signal intensity and a horizontal axis represents time. The zero-cross signal 42 is a binarized signal that becomes 1 at a zero-cross timing and becomes 0 at a timing other than the zero-cross. In the first embodiment, a point where the alternating voltage signal 41 changes from negative to zero is defined as zero cross. Thus, the mirror control portion 23 sets a value of the zero-cross signal 42 to 1 at the timing when the alternating voltage signal 41 changes from negative to zero, and sets the value of the zero-cross signal 42 to 0 otherwise. Moreover, in the first embodiment, the mirror portion 21 (the light blocking portion 27) is assumed to be positioned at the swing end $\theta_{e2}$ of the other swing angle side $A_2$ at the timing of zero cross. In addition, at the timing when the alternating voltage signal 41 changes from positive to zero, the mirror portion 21 (the light blocking portion 27) is assumed to be positioned at the swing end $\theta_{e1}$ of the one swing angle side $A_1$.

A graph G4 shown in FIG. 10 is a graph of the detection signal 43. Specifically, in the graph G4, the mirror control portion 23 (see FIG. 1) binarizes, on the basis of a preset threshold value, the detection signal 43 based on a detection result of the light reception portion 25b sent from the optical sensor 25 (see FIG. 1). The binarized detection signal 43 (binarized signal) is a pulsed signal in which the first light reception section Se1 and the second light reception section Se2 represent a HIGH state and the light blocking section Se3 represents a LOW state. In the first embodiment, as shown in the graph G4, two pulses in the HIGH state appear during one period T.

In addition, in the graph G4, a first light reception time $t_1$ is a time length during which the light blocking portion 27 swings in the first light reception section Se1. In the first embodiment, the first light reception time $t_1$ is a time length from the rise to the fall of a pulse that does not include the zero-cross detection timing. In other words, the first light reception time $t_1$ is a time length from the time when the mirror portion 21 enters the first light reception section Se1 to the time when the mirror portion 21 exits the first light reception section Se1. In addition, a second light reception time $t_2$ is a time length during which the light blocking portion 27 swings in the second light reception section Se2. In the first embodiment, the second light reception time $t_2$ is a time length from the rise to the fall of a pulse including the zero-cross detection timing. In other words, the second light reception time $t_2$ is a time length from the time when the mirror portion 21 enters the second light reception section Se2 to the time when the mirror portion 21 exits the second light reception section Se2.

In addition, a first light blocking time $t_{3a}$ is a time length during which the light blocking portion 27 passes through the light blocking section Se3 by swinging toward the other swing angle side $A_2$. In the first embodiment, the first light blocking time $t_{3a}$ is a time length from the fall of a pulse including the zero-cross detection timing to the fall of the next pulse. In addition, a second light blocking time $t_{3b}$ is a time length during which the light blocking portion 27 passes through the light blocking section Se3 by swinging toward the one swing angle side $A_1$. In the first embodiment, the second light blocking time $t_{3b}$ is a time length from the fall of a pulse that does not include the zero-cross detection timing to the rise of the next pulse.

(Swing Control of Mirror Portion)

In the first embodiment, the mirror control portion 23 acquires the state of the swing of the mirror portion 21 based on the light reception state of the light reception portion 25b and the zero-cross timing of the alternating voltage, and controls the swing of the mirror portion 21. Specifically, the mirror control portion 23 controls the swing of the mirror portion 21 by performing pre-processing, determination of the swing state of the mirror portion 21, and adjustment of the alternating voltage. Moreover, in the first embodiment, the mirror control portion 23 controls the swing of the mirror portion 21 for each period T using the zero-cross detection as a trigger.

(Pre-Processing)

First, as pre-processing, the mirror control portion 23 causes the mirror portion 21 to swing in a manner that the swing angle of the mirror portion 21 becomes the predetermined swing angle $\theta_a$. The mirror control portion 23 causes the mirror portion 21 to swing in advance at the predetermined swing angle $\theta_a$, and the mirror control portion 23 acquires, based on the first light reception time $t_1$, a first angle $\theta_1$ which is a swing angle of the light blocking portion 27 at a timing of switching the first light reception section Se1 and the light blocking section Se3. In addition, the mirror control portion 23 acquires, based on the second light reception time $t_2$, a second angle $\theta_2$ which is a swing angle of the light blocking portion 27 at a timing of switching the second light reception section Se2 and the light blocking section Se3. Specifically, the mirror control portion 23 acquires the first angle $\theta_1$ and the second angle $\theta_2$ based on the following formulas (1) and (2). Moreover, the predetermined swing angle $\theta_a$ is the actually measured swing angle of the light blocking portion 27 and is a constant.

[Equation 1]

$$\theta_1 = \frac{\theta_a}{2}\cos\left(\pi \times \frac{t_1}{T}\right) \quad (1)$$

$$\theta_2 = \frac{\theta_a}{2}\cos\left(\pi \times \frac{t_2}{T}\right) \quad (2)$$

The mirror control portion 23 stores the acquired first angle $\theta_1$ and second angle $\theta_2$ in the storage unit 30. Moreover, the pre-processing is executed when the projector 100 is manufactured.

(Determination of Swing State of Mirror Portion)

In the first embodiment, the mirror control portion 23 detects whether the swing of the mirror portion 21 is normal based on the first light reception section Se1, the second light reception section Se2, and the zero-cross timing. Specifically, the mirror control portion 23 determines that the swing of the mirror portion 21 is normal when the zero-cross timing is included in the second light reception section Se2, and determines that the swing of the mirror portion 21 is abnormal when the zero-cross timing is included in the first light reception section Se.

(Swing Control of Mirror Portion)

In the first embodiment, the mirror control portion 23 controls the swing of the mirror portion 21 when the swing of the mirror portion 21 is normal. Specifically, the mirror control portion 23 acquires the swing state of the mirror portion 21 based on the first light reception section Se1, the second light reception section Se2, and the zero-cross timing, and controls the swing of the mirror portion 21.

The mirror control portion 23 acquires the first light reception time $t_1$ and the second light reception time $t_2$, and controls the swing of the mirror portion 21 based on the acquired first light reception time $t_1$, the acquired second light reception time $t_2$, and a predetermined target swing angle $\theta_c$.

Moreover, in the first embodiment, the mirror control portion 23 acquires the first light reception time $t_1$ based on the zero-cross detection timing, a timing of switching from the light blocking section Se3 to the first light reception section Se1, and a timing of switching from the first light reception section Se1 to the light blocking section Se3. That is, the pulse detection time in the HIGH state when the zero cross is not detected is the first light reception time $t_1$. In addition, the mirror control portion 23 acquires the second light reception time $t_2$ based on the zero-cross detection timing, a timing of switching from the light blocking section Se3 to the second light reception section Se2, and a timing of switching from the second light reception section Se2 to the light blocking section Se3. That is, the pulse detection time in the HIGH state when the zero cross is detected is the second light reception time $t_2$.

The mirror control portion 23 acquires a swing angle $\theta_b$ of the mirror portion 21 based on the first angle $\theta_1$, the second angle $\theta_2$, the first light reception time $t_1$, and the second light reception time $t_2$ that are acquired in advance. Specifically, the mirror control portion 23 acquires the swing angle $\theta_b$ of the mirror portion 21 based on the following formula (3).

[Equation 2]

$$\theta_b = \frac{2(\theta_1 - \theta_2)}{\cos\left(\pi \times \frac{t_1}{T}\right) + \cos\left(\pi \times \frac{t_2}{T}\right)} \tag{3}$$

In addition, the preset predetermined target swing angle $\theta_c$ is stored in the storage unit 30.

In the first embodiment, the mirror control portion 23 controls the swing angle of the mirror portion 21 by comparing the acquired swing angle $\theta_b$ of the mirror portion 21 with the predetermined target swing angle $\theta_c$. That is, the mirror control portion 23 calculates the swing angle $\theta_b$ of the mirror portion 21 based on the binarized detection signal 43 (the binarized signal) and performs the PID control to obtain the target swing angle $\theta_c$. In addition, in the first embodiment, the mirror control portion 23 controls the swing of the mirror portion 21 for each period T based on the first light reception time $t_1$, the second light reception time $t_2$, and the predetermined target swing angle $\theta_c$.

In addition, the mirror control portion 23 can acquire a deviation amount $\theta_f$ of the swing angle center of the mirror portion 21 by the following formula (4).

[Equation 3]

$$\theta_f = \frac{\theta_b}{4\left\{\cos\left(\pi \times \frac{t_1}{T}\right) + \cos\left(\pi \times \frac{t_2}{T}\right)\right\}} \tag{4}$$

Figure 11:
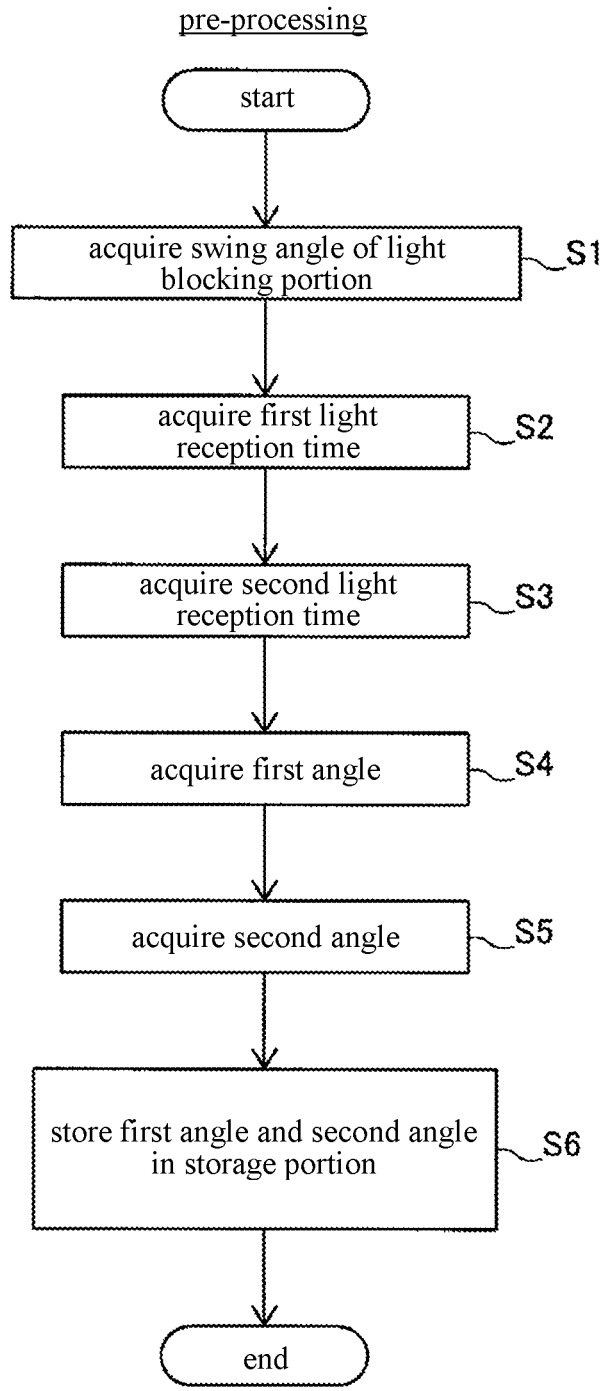
FIG. 11 is a flowchart for illustrating pre-processing performed by a mirror control portion according to the first embodiment.

Next, the pre-processing performed by the mirror control portion 23 is described with reference to FIG. 11.

In step S1, the mirror control portion 23 acquires the swing angle $\theta_a$ of the light blocking portion 27. Moreover, in the processing in step S1, the actual swing angle $\theta_a$ is acquired using a sensor or the like that can detect the angle of the light blocking portion 27.

In step S2, the mirror control portion 23 acquires the first light reception time $t_1$ based on the detection signal 43.

In step S3, the mirror control portion 23 acquires the second light reception time $t_2$ based on the detection signal 43.

In step S4, the mirror control portion 23 acquires the first angle $\theta_1$ based on the above formula (1).

In step S5, the mirror control portion 23 acquires the second angle $\theta_2$ based on the above formula (2).

In step S6, the mirror control portion 23 stores the acquired first angle $\theta_1$ and second angle $\theta_2$ in the storage unit 30. Thereafter, the processing ends.

Figure 12:
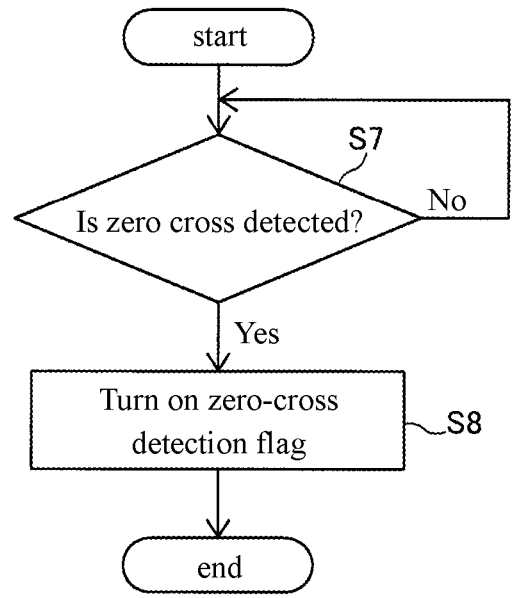
FIG. 12 is a flowchart for illustrating processing in which the mirror control portion according to the first embodiment determines a zero cross.
Figure 13:
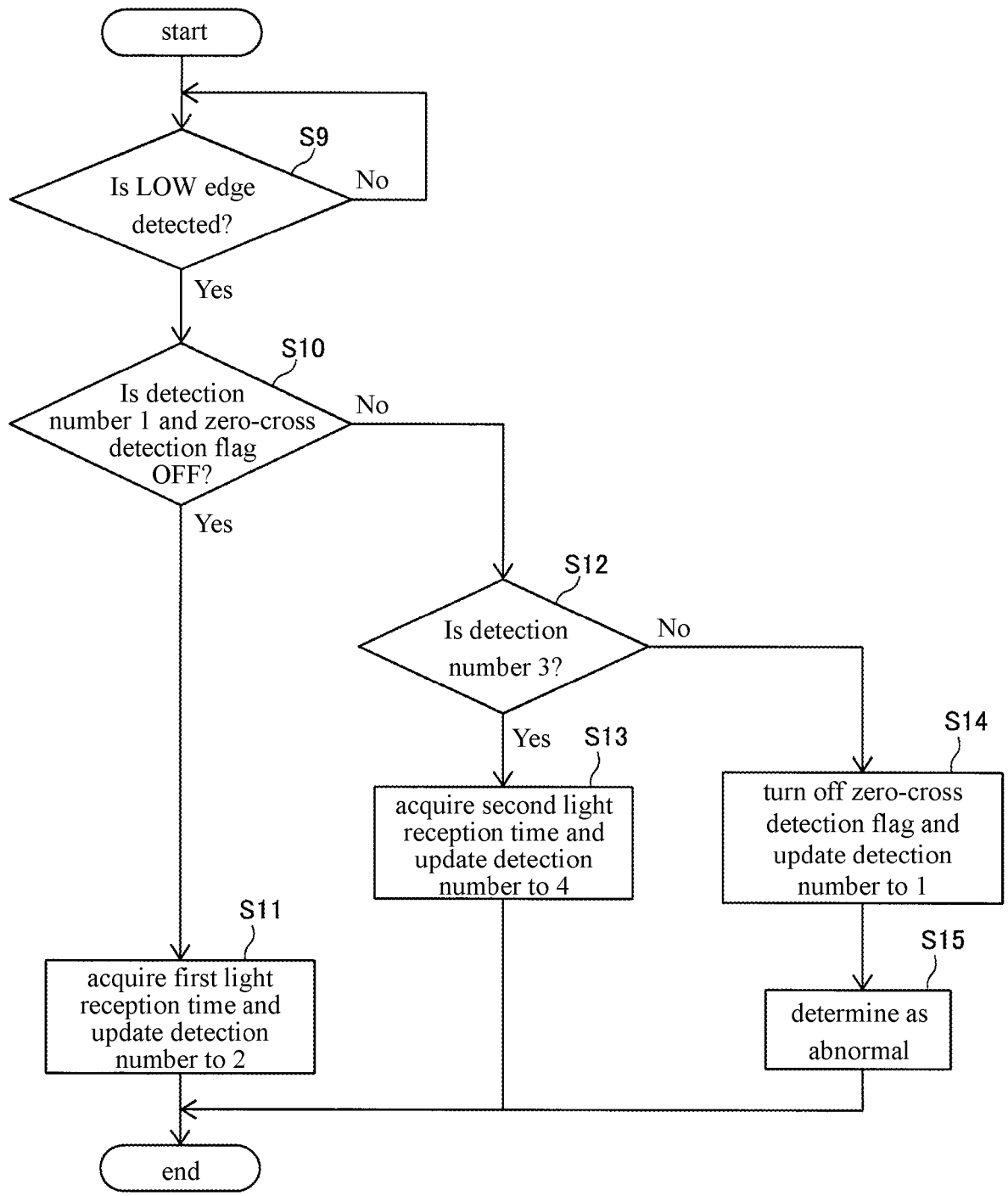
FIG. 13 is a flowchart for illustrating processing in which the mirror control portion according to the first embodiment detects a LOW edge.
Figure 14:
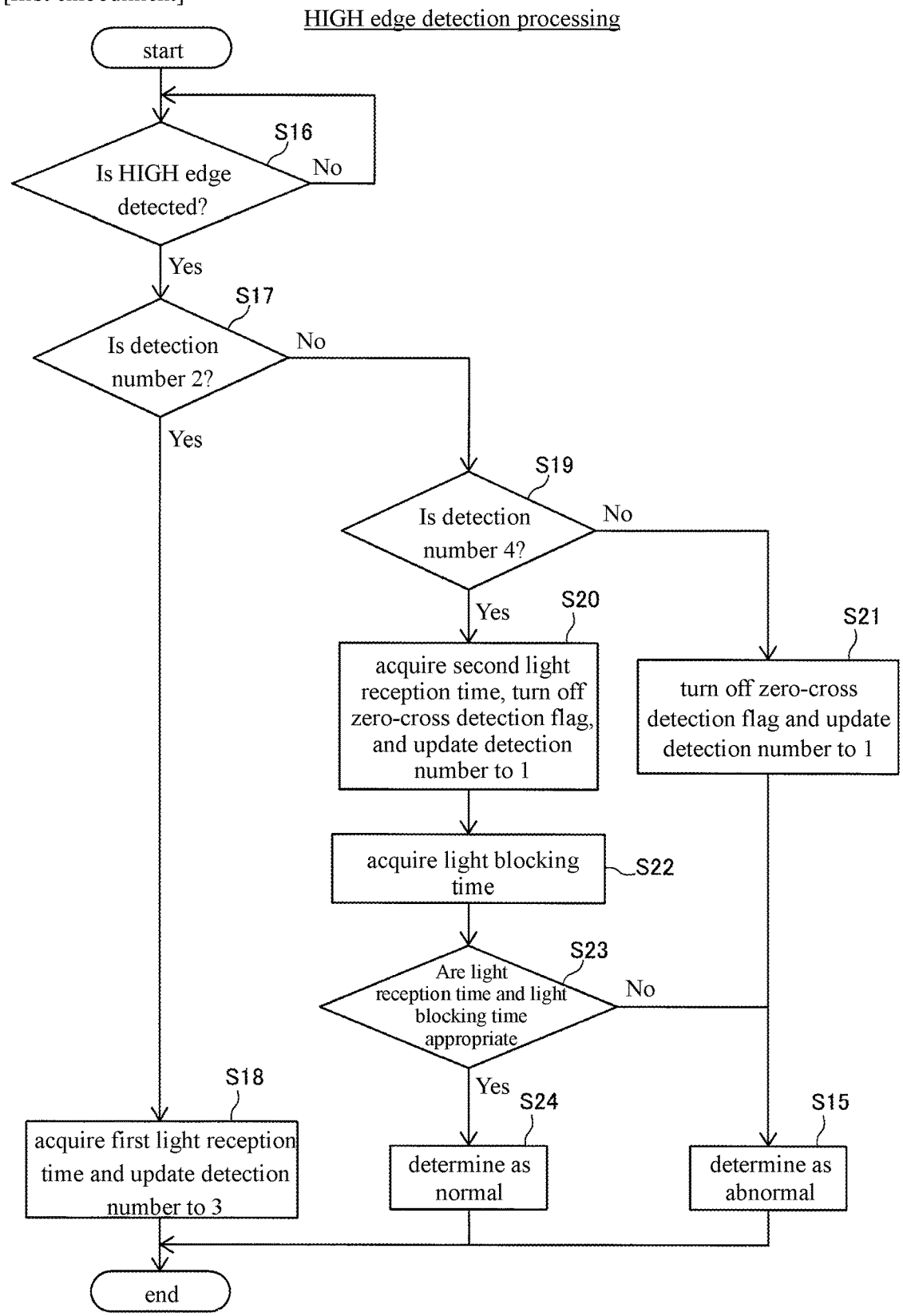
FIG. 14 is a flowchart for illustrating processing in which the mirror control portion according to the first embodiment detects a HIGH edge.

Next, processing in which the mirror control portion 23 determines the swing state of the mirror portion 21 is described with reference to FIGS. 12 to 14. Moreover, the processing in which the mirror control portion 23 determines the swing state of the mirror portion 21 is executed on the assumption that the pre-processing in steps S1 to S6 is performed in advance and the first angle $\theta_1$ and the second angle $\theta_2$ are stored in the storage unit 30. In addition, the processing in which the mirror control portion 23 determines the swing state of the mirror portion 21 is executed by performing zero-cross determination processing, LOW edge detection processing, and HIGH edge detection processing.

First, the zero-cross determination processing performed by the mirror control portion 23 is described with reference to FIG. 12.

In step S7, the mirror control portion 23 determines whether the zero cross is detected based on an alternating voltage binarized signal 44. When the zero cross is detected, the processing proceeds to step S8. When the zero cross is not detected, the processing of step S7 is repeated.

In step S8, the mirror control portion 23 turns on a zero-cross detection flag. Thereafter, the processing ends.

Next, the LOW edge detection processing performed by the mirror control portion 23 is described with reference to FIG. 13.

In step S9, the mirror control portion 23 determines, based on the detection signal 43, whether a LOW edge is detected. When the LOW edge is detected, the processing proceeds to step S10. When the LOW edge is not detected, the processing of step S9 is repeated.

In step S10, the mirror control portion 23 determines whether a detection number is 1 and whether the zero-cross detection flag is OFF. When the detection signal is 1 and the zero-cross detection flag is OFF, the processing proceeds to step S11. Otherwise, the processing proceeds to step S12. Moreover, the detection number is a number used to determine the swing state of the mirror portion 21, and an initial value thereof is 1.

In step S11, the mirror control portion 23 acquires the first light reception time $t_1$. Moreover, the first light reception time $t_1$ acquired in step S11 is a time length during which the light blocking portion 27 actually swings in the first light reception section Se1 when the light blocking portion 27 swings during the swing control. In addition, the mirror control portion 23 also updates the detection number to 2. Thereafter, the processing ends.

When the LOW edge detection processing proceeds from step S10 to step S12, in step S12, the mirror control portion 23 determines whether the detection number is 3. When the detection number is 3, the processing proceeds to step S13. When the detection number is other than 3, the processing proceeds to step S14.

In step S13, the mirror control portion 23 acquires the second light reception time $t_2$ based on the detection signal 43. Moreover, the second light reception time $t_2$ acquired in step S13 is a time length during which the light blocking portion 27 actually swings in the second light reception section Se2 when the light blocking portion 27 swings during the swing control. In addition, the mirror control portion 23 updates the detection number to 4. Thereafter, the processing ends.

When the processing proceeds from step S12 to step S14, the mirror control portion 23 turns off the zero-cross detection flag in step S14. In addition, the mirror control portion 23 updates the detection number to 1. Thereafter, the processing proceeds to step S15.

In step S15, the mirror control portion 23 determines that the swing state of the mirror portion 21 is abnormal. Moreover, when the swing state of the mirror portion 21 is abnormal, the mirror control portion 23 stores, for example, a status of the swing state of the mirror portion 21 as abnormal in the storage unit 30. Thereafter, the processing ends.

Next, the HIGH edge detection processing performed by the mirror control portion 23 is described with reference to FIG. 14.

In step S16, the mirror control portion 23 determines, based on the detection signal 43, whether a HIGH edge is detected. When the HIGH edge is detected, the processing proceeds to step S17. When the HIGH edge is not detected, the processing of step S16 is repeated.

In step S17, the mirror control portion 23 determines whether the detection number is 2. When the detection number is 2, the processing proceeds to step S18. Otherwise, the processing proceeds to step S19.

In step S18, the mirror control portion 23 acquires the first light blocking time $t_{3a}$ based on the detection signal 43. Moreover, the first light blocking time $t_{3a}$ acquired in step S18 is a time length of actually passing through the light blocking section Se3 by swinging to the other swing angle side $A_2$ when the light blocking portion 27 swings during the swing control.

When the processing proceeds from step S17 to step S19, in step S19, the mirror control portion 23 determines whether the detection number is 4. When the detection number is 4, the processing proceeds to step S20. Otherwise, the processing proceeds to step S21.

In step S20, the mirror control portion 23 acquires the second light blocking time $t_{3b}$ based on the detection signal 43. Moreover, the second light blocking time $t_{3b}$ acquired in step S20 is actually a time length of passing through the light blocking section Se3 by swinging to the one swing angle side $A_1$ when the light blocking portion 27 swings during the swing control. In addition, the mirror control portion 23 turns off the zero-cross detection flag. In addition, the mirror control portion 23 updates the detection number to 1.

In step S22, the mirror control portion 23 acquires a light blocking time $t_3$ based on the acquired first light blocking time $t_{3a}$ and second light blocking time $t_{3b}$. Specifically, the mirror control portion 23 acquires the light blocking time $t_3$ based on the following formula (5).

[Equation 4]

$$t_3 = \frac{t_{3a} + t_{3b}}{2} \qquad (5)$$

In step S23, the mirror control portion 23 determines whether the light reception time and the light blocking time are appropriate. Specifically, the mirror control portion 23 determines whether a determination time $t_4$ acquired by the following formula (6) satisfies the condition of the following formula (7). That is, the mirror control portion 23 determines, based on whether the determination time $t_4$ is within a preset allowable range, whether the light reception time and the light blocking time are appropriate. In the first embodiment, the allowable range is, for example, a range of ±1% with respect to the setting period (half period of the period T of the swing signal 40). The allowable range may be a range other than this range. When the determination time $t_4$ satisfies the condition of formula (7), the processing proceeds to step S15. When the determination time $t_4$ does not satisfy the condition of formula (7), the processing proceeds to step S24.

[Equation 5]

$$t_4 = t_3 + \frac{t_1 + t_2}{2} \qquad (6)$$

$$0.99 \times \frac{1}{2}T < t_4 < 1.01 \times \frac{1}{2}T \qquad (7)$$

In step S24, the mirror control portion 23 determines that the swing state of the mirror portion 21 is normal. Moreover, when the swing state of the mirror portion 21 is normal, the mirror control portion 23 stores, for example, a status of the swing state of the mirror portion 21 in the storage unit 30 as normal. Thereafter, the processing ends.

In addition, when the processing proceeds from step S19 to step S21, the mirror control portion 23 turns off the zero-cross detection flag in step S21. In addition, the mirror control portion 23 updates the detection number to 1. Thereafter, the processing proceeds to step S15, and the swing state of the mirror portion 21 is determined to be abnormal. Thereafter, the processing ends.

In the first embodiment, the mirror control portion 23 determines the swing state of the mirror portion 21 by performing the zero-cross determination processing, the LOW edge detection processing, and the HIGH edge detection processing in combination.

Figure 15:
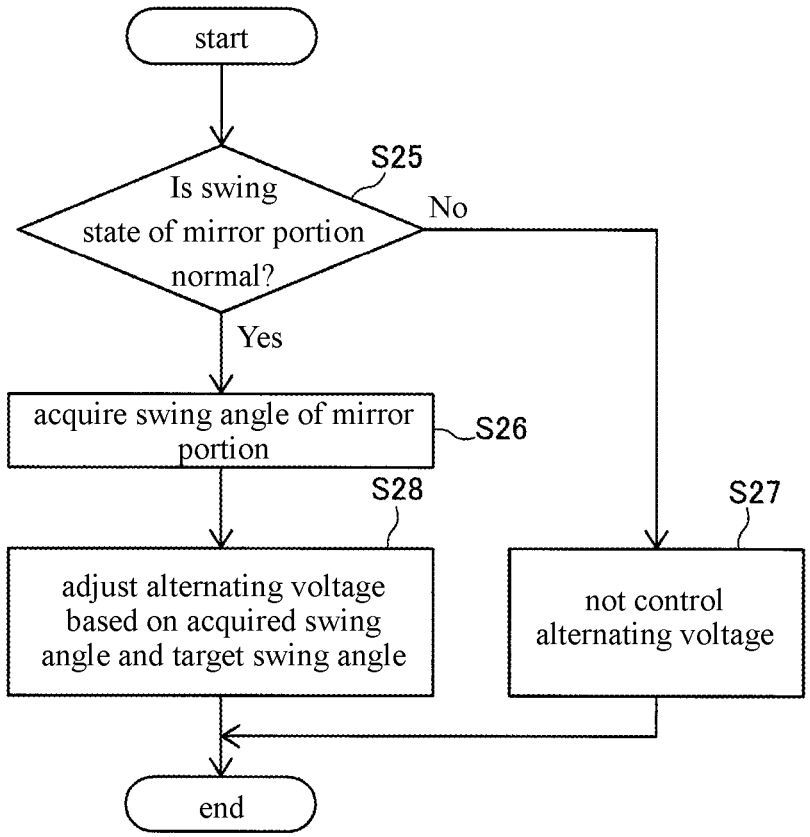
FIG. 15 is a flowchart for illustrating control of an alternating voltage performed by the mirror control portion according to the first embodiment.

Next, processing in which the mirror control portion 23 adjusts the alternating voltage is described with reference to FIG. 15.

In step S25, the mirror control portion 23 acquires whether the swing state of the mirror portion 21 is normal. Specifically, the mirror control portion 23 acquires the status of the swing state of the mirror portion 21 stored in the storage unit 30, and determines whether the swing state of the mirror portion 21 is normal. When the swing state of the mirror portion 21 is normal, the processing proceeds to step S26. When the swing state of the mirror portion 21 is abnormal, the processing proceeds to step S27.

In step S26, the mirror control portion 23 acquires the swing angle $\theta_b$ of the mirror portion 21. Thereafter, in step S28, the mirror control portion 23 controls the alternating voltage in order that the acquired swing angle $\theta_b$ becomes the target swing angle $\theta_c$. Specifically, the mirror control portion 23 controls the alternating voltage by the PID control of feeding back the swing angle $\theta_b$ and controlling the swing angle $\theta_b$ to become the target swing angle $\theta_c$. Thereafter, the processing ends.

When it is determined in step S25 that the swing of the mirror portion 21 is abnormal, the processing proceeds to step S27. In step S27, the mirror control portion 23 does not control the alternating voltage. Specifically, the mirror control portion 23 maintains the alternating voltage set during the previous control without changing the alternating voltage. Thereafter, the processing ends.

In the first embodiment, as described above, the optical scanner unit 20 includes: the mirror portion 21 including the reflection part which reflects light; the mirror drive portion 22 which causes the mirror portion 21 to swing around the predetermined swing axis by applying the alternating voltage; the single optical sensor 25 including the single light emission portion 25a and the single light reception portion 25b which receives the light emitted from the light emission portion 25a; the light blocking portion 27 which is arranged in the mirror portion 21 to swing together with the swing of the mirror portion 21 and periodically blocks the light emitted from the light emission portion 25a along with the swing; and the mirror control portion 23 which controls the swing of the mirror portion 21 based on the alternating voltage and the detection signal of the optical sensor 25, wherein the mirror control portion 23 acquires the state of the swing of the mirror portion 21 based on the light reception state of the light reception portion 25b and the zero-cross timing of the alternating voltage, and controls the swing of the mirror portion 21. In this way, the swing direction of the mirror portion 21 can be detected according to the light reception state of the light reception portion 25b and the zero-cross timing of the alternating voltage. Thus, even when the state of the swing of the mirror portion 21 is detected by the single optical sensor including the single light emission portion 25a and the single light reception portion 25b, the swing direction of the mirror portion 21 can be detected, and thus, the swing of the mirror portion 21 can be controlled. As a result, the optical scanner unit 20 capable of suppressing an increase in the number of components and complication of the device configuration can be provided.

In addition, in the first embodiment, as described above, the mirror control portion 23 acquires the first light reception time $t_1$ and the second light reception time $t_2$, and controls the swing of the mirror portion 21 based on the acquired first light reception time $t_1$, the acquired second light reception time $t_2$, and the predetermined target swing angle $\theta_c$, wherein the first light reception time $t_1$ is the time length during which the light blocking portion 27 swings in the first light reception section Se1, and the second light reception time $t_2$ is the time length during which the light blocking portion 27 swings in the second light reception section Se2. In this way, the swing angle $\theta_b$ of the mirror portion 21 can be acquired according to the first light reception time $t_1$ and the second light reception time $t_2$. As a result, the swing of the mirror portion 21 can be easily feedback-controlled by comparing the acquired swing angle $\theta_b$ of the mirror portion 21 and the target swing angle $\theta_c$.

In addition, in the first embodiment, as described above, the mirror control portion 23 acquires the first light reception time $t_1$ based on the timing of switching from the light blocking section Se3 to the first light reception section Se1 and the timing of switching from the first light reception section Se1 to the light blocking section Se3, and the mirror control portion 23 acquires the second light reception time $t_2$ based on the timing of switching from the light blocking section Se3 to the second light reception section Se2 and the timing of switching from the second light reception section Se2 to the light blocking section Se3, wherein the light blocking section Se3 is the section in which the light blocking portion 27 swings to block the light reception portion 25b. In this way, the first light reception time $t_1$ can be easily acquired by acquiring the timing of switching from the light blocking section Se3 to the first light reception section Se1 and the timing of switching from the first light reception section Se1 to the light blocking section Se3. In addition, the second light reception time $t_2$ can be easily acquired by acquiring the timing of switching from the light blocking section Se3 to the second light reception section Se2 and the timing of switching from the second light reception section Se2 to the light blocking section Se3.

In addition, in the first embodiment, as described above, the mirror control portion 23 acquires the first angle $\theta_1$ based on the first light reception time $t_1$, acquires the second angle $\theta_2$ based on the second light reception time $t_2$, acquires the swing angle $\theta_b$ of the mirror portion 21 according to the acquired first angle $\theta_1$, the acquired second angle $\theta_2$, the first light reception time $t_1$, and the second light reception time $t_2$, and controls the swing angle $\theta_b$ of the mirror portion 21 by comparing the acquired swing angle $\theta_b$ of the mirror portion 21 with the predetermined target swing angle $\theta_c$, wherein the first angle $\theta_1$ is the swing angle $\theta_b$ of the light blocking portion 27 at the timing when the first light reception section Se1 and the light blocking section Se3 are switched, and the second angle $\theta_2$ is the swing angle $\theta_b$ of the light blocking portion 27 at the timing when the second light reception section Se2 and the light blocking section Se3 are switched. In this way, by performing the PID control or the like of feeding back the value of the actual swing angle $\theta_b$ of the mirror portion 21 and controlling the swing angle $\theta_b$ of the mirror portion 21 to become the target swing angle $\theta_c$, the alternating voltage can be controlled, and the swing angle $\theta_b$ of the mirror portion 21 can be easily set to the target swing angle $\theta_c$.

In addition, in the first embodiment, as described above, the mirror control portion 23 detects whether the swing of the mirror portion 21 is normal based on the first light reception section Se1, the second light reception section Se2, and the zero-cross timing. In this way, when the swing of the mirror portion 21 is not normal, for example, it is possible to avoid controlling the swing of the mirror portion 21 by using abnormal parameters, for example, processing in a manner of maintaining the previous voltage value without changing the value of the alternating voltage. In addition, when the swing of the mirror portion 21 is normal, the mirror portion 21 can be swung by the target swing angle $\theta_c$ by controlling the swing of the mirror portion 21 using the acquired parameters.

In addition, in the first embodiment, as described above, the mirror control portion 23 determines that the swing of the mirror portion 21 is normal when the zero-cross timing is included in the second light reception section Se2, and determines that the swing of the mirror portion 21 is abnormal when the zero-cross timing is included in the first light reception section Se1. In this way, the state of the swing of the mirror portion 21 can be easily determined by acquiring the zero-cross timing and the light reception section at that time.

In addition, in the first embodiment, as described above, the mirror control portion 23 controls the swing of the mirror portion 21 for each period based on the first light reception time $t_1$, the second light reception time $t_2$, and the predetermined target swing angle $\theta_c$. In this way, the swing of the mirror portion 21 can be controlled for each period, and thus, for example, compared with a configuration in which the swing of the mirror portion 21 is controlled every several periods, the swing of the mirror portion 21 can be controlled more precisely.

In addition, in the first embodiment, as described above, the light reception portion 25b is arranged at a position overlapping a position where the swing angle $\theta_b$ of the light blocking portion 27 is 0 degree when the alternating voltage is not applied. In this way, the light reception portion 25b can be arranged at a position which is a center of the swing range of the light blocking portion 27. As a result, because the light reception portion 25b is arranged at the position which is the center of the swing angle $\theta_b$ of the light blocking portion 27, deviation of the central position of the swing angle $\theta_b$ of the light blocking portion 27 can be easily acquired by comparing the first light reception time $t_1$ and the second light reception time $t_2$.

In addition, in the first embodiment, as described above, the optical sensor 25 is arranged between the mirror portion 21 and the mirror drive portion 22. In this way, when the mirror portion 21 and the mirror drive portion 22 are fixed to the base member 26 at the corners (the fixed portion 24f and the fixed portion 24g) or the outer periphery (the fixed portion 24h) to stabilize the swing of the mirror portion 21, compared with a case where the optical sensor 25 is arranged on the side (the Y2 side) of the mirror portion 21 opposite to the mirror drive portion 22, the side (the Y1 side) of the mirror drive portion 22 opposite to the mirror portion 21, or the like, the optical sensor 25 can be arranged at a position distant from a position (the corner or the outer periphery) where the mirror portion 21 and the mirror drive portion 22 are fixed. As a result, the optical sensor 25 can be prevented from vibrating due to propagation of the vibration generated by the mirror drive portion 22 to the optical sensor 25, and thus, the detection precision of the swing angle $\theta_b$ of the mirror portion 21 based on the light incident on the light reception portion 25b of the optical sensor 25 can be prevented from decreasing.

In addition, in the first embodiment, as described above, the light blocking portion 27 protrudes from the mirror portion 21 toward the optical sensor 25 side along the surface direction in which the surface 21c of the mirror substrate 21a extends. Besides, the light blocking portion 27 has the thickness W2 smaller than the thickness W1 of the mirror portion 21 in the direction (the Z-direction) orthogonal to the direction (the Y-direction) in which the surface 21c extends. In this way, the thickness W2 of the light blocking portion 27 is smaller than the thickness W1 of the mirror portion 21, and thus, a mass of the light blocking portion 27 can be prevented from increasing. Thus, a mass of the swing part including the mirror portion 21 and the light blocking portion 27 can be prevented from increasing due to the increase in the mass of the light blocking portion 27 which protrudes from the mirror portion 21 toward the optical sensor 25 side. As a result, decrease in a resonance frequency of the aforementioned swing part, deviation of a center-of-gravity position of the swing part, and the like can be prevented from occurring as the mass of the swing part is increased.

Second Embodiment

A second embodiment is described with reference to FIG. 16. In the second embodiment, different from the aforementioned first embodiment in which the mirror control portion 23 acquires the swing angle $\theta_b$ of the mirror portion 21 and controls the alternating voltage by comparing the swing angle $\theta_b$ with the target swing angle $\theta_c$, an example is described in which the alternating voltage is controlled to set the light blocking time $t_3$ to a target light blocking time $t_a$. Moreover, in the diagram, the same reference numerals are given to parts having the same configurations as those of the first embodiment.

Figure 16:
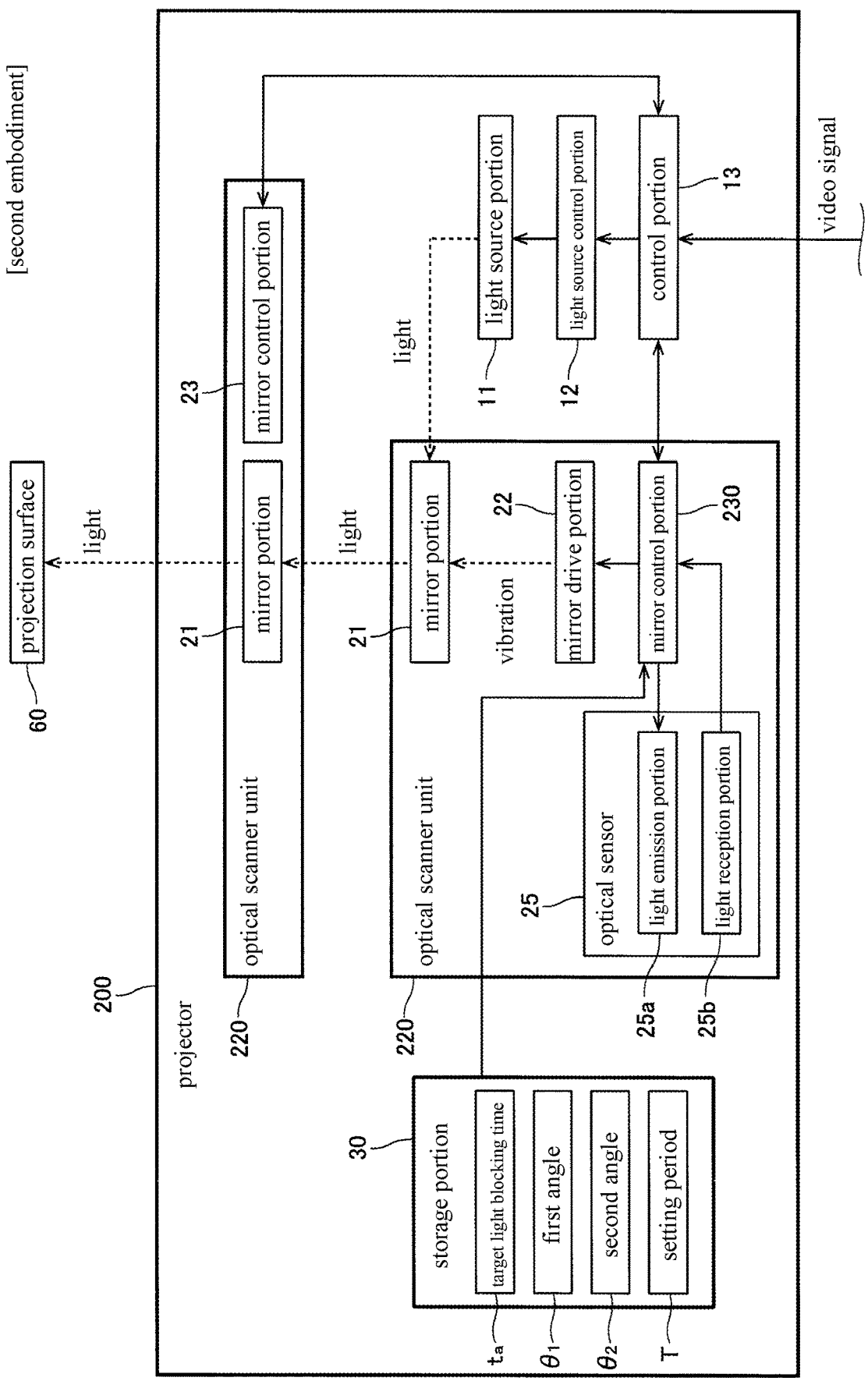
FIG. 16 is a block diagram showing an overall configuration of a projector according to a second embodiment.

As shown in FIG. 16, a projector 200 according to the second embodiment is different from the projector 100 in the first embodiment in terms that the projector 200 includes an optical scanner unit 220 instead of the optical scanner unit 20. Moreover, the projector 200 is an example of the "optical apparatus" in the claims.

The optical scanner unit 220 is different from the optical scanner unit 20 in the first embodiment in terms that the optical scanner unit 220 includes a mirror control portion 230 instead of the mirror control portion 23.

In the second embodiment, the mirror control portion 230 acquires the first light blocking time $t_{3a}$ and the second light blocking time $t_{3b}$, wherein the first light blocking time $t_{3a}$ is a time length during which the light blocking portion 27 passes through the light blocking section Se3 by swinging toward the other swing angle side $A_2$, and the second light blocking time $t_{3b}$ is a time length during which the light blocking portion 27 passes through the light blocking section Se3 by swinging toward the one swing angle side $A_1$. In addition, the mirror control portion 230 acquires the light blocking time $t_3$ based on the acquired first light blocking time $t_{3a}$ and the acquired second light blocking time $t_{3b}$, and the light blocking time $t_3$ is a time length during which the light blocking portion 27 blocks light for the light reception portion 25b. Similar to the mirror control portion 23 according to the aforementioned first embodiment, the mirror control portion 230 acquires the light blocking time $t_3$ based on the aforementioned formula (5).

The mirror control portion 230 controls the swing of the mirror portion 21 by comparing the acquired light blocking time $t_3$ with the target light blocking time $t_a$. Moreover, the target light blocking time $t_a$ is a time length during which the light blocking portion 27 blocks light for the light reception portion 25b when the mirror portion 21 is swung by the predetermined target swing angle $\theta_c$. In addition, the target light blocking time $t_a$ is acquired in advance by the mirror control portion 230 and stored in the storage unit 30. The mirror control portion 230 acquires the target light blocking time $t_a$ based on the following formula (8).

[Equation 6]

$$t_a = \frac{T}{2} - \frac{t_1}{4} - \frac{t_2}{4} - \frac{T}{4n\left[\arccos\left\{\frac{2(\theta_1-\theta_2)}{\theta_c} - \cos\left(\pi \times \frac{t_1}{T}\right)\right\} + \arccos\left\{\frac{2(\theta_1-\theta_2)}{\theta_c} - \cos\left(\pi \times \frac{t_2}{T}\right)\right\}\right]} \quad (8)$$

Figure 17:
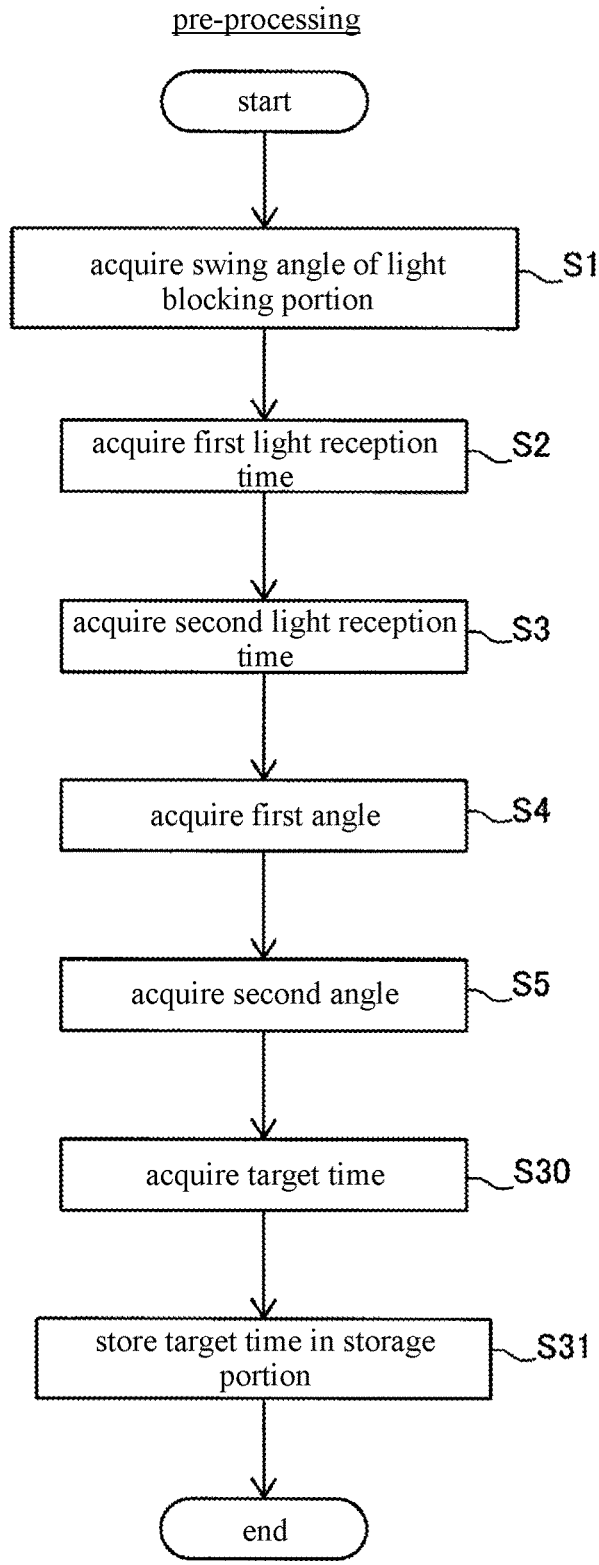
FIG. 17 is a flowchart for illustrating pre-processing performed by a mirror control portion according to the second embodiment.

Next, pre-processing performed by the mirror control portion 230 according to the second embodiment is described with reference to FIG. 17. Moreover, the same processing as that of the mirror control portion 23 according to the first embodiment described above is designated by the same reference numerals, and specific description thereof is omitted.

In steps S1 to S5, the mirror control portion 230 acquires the swing angle $\theta_b$ of the light blocking portion 27, the first light reception time $t_1$, the second light reception time $t_2$, the first angle $\theta_1$, and the second angle $\theta_2$.

In step S30, the mirror control portion 230 acquires the target light blocking time $t_a$. Specifically, the mirror control portion 230 acquires the target light blocking time $t_a$ based on the above formula (8).

In step S31, the mirror control portion 230 stores the acquired target light blocking time $t_a$ in the storage unit 30. Thereafter, the processing ends.

Figure 18:
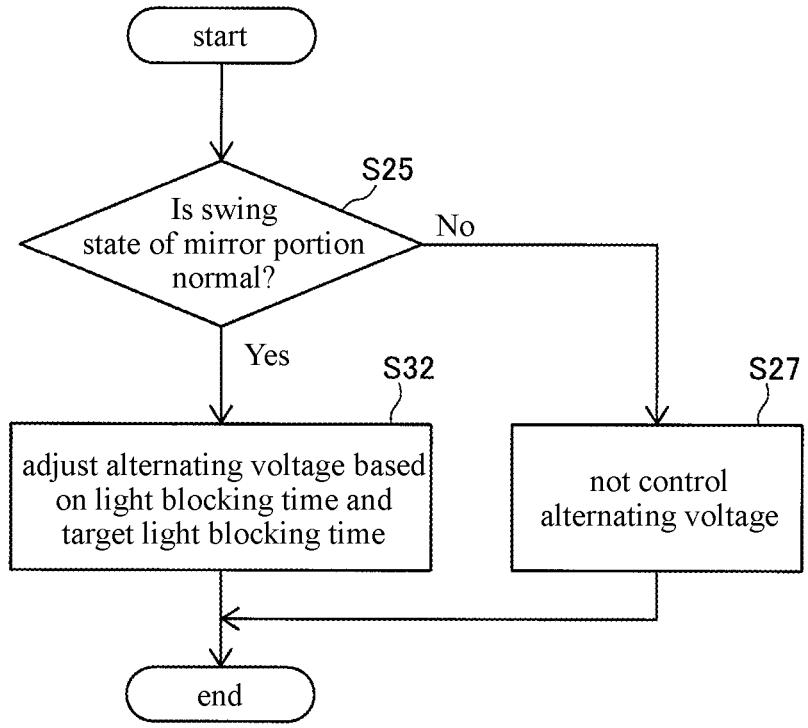
FIG. 18 is a flowchart for illustrating control of an alternating voltage performed by the mirror control portion according to the second embodiment.

Next, processing in which the mirror control portion 230 controls the alternating voltage is described with reference to FIG. 18. Moreover, the same processing as that of the mirror control portion 23 according to the first embodiment described above is designated by the same reference numerals, and specific description thereof is omitted. In addition, similar to in the mirror control portion 23 according to the first embodiment, the processing in which the mirror control portion 230 controls the alternating voltage is executed after the swing state of the mirror portion 21 is determined.

In step S25, the mirror control portion 230 acquires whether the swing state of the mirror portion 21 is normal. When the swing state of the mirror portion 21 is normal, the processing proceeds to step S32. When the swing state of the mirror portion 21 is abnormal, the processing proceeds to step S27, and then the processing ends.

In step S32, the mirror control portion 230 controls the alternating voltage based on the light blocking time $t_3$ and the target light blocking time $t_a$. Specifically, the mirror control portion 230 controls the alternating voltage by the PID control of feeding back the light blocking time $t_3$ and controlling the light blocking time $t_3$ to become the target light blocking time $t_a$. Thereafter, the processing ends.

Moreover, the other configurations of the projector 200 according to the second embodiment are the same as those of the first embodiment.

In the second embodiment, as described above, the mirror control portion 230 acquires the first light blocking time $t_{3a}$ and the second light blocking time $t_3b$, acquires the light blocking time $t_3$ based on the acquired first light blocking time $t_{3a}$ and the acquired second light blocking time $t_{3b}$, and controls the swing of the mirror portion 21 by comparing the acquired light blocking time $t_3$ with the target light blocking time $t_a$, wherein the first light blocking time $t_{3a}$ is the time length during which the light blocking portion 27 passes through the light blocking section Se3 by swinging toward the other swing angle side $A_2$, the second light blocking time $t_{3b}$ is the time length during which the light blocking portion 27 passes through the light blocking section Se3 by swinging toward the one swing angle side $A_1$, the light blocking time $t_3$ is the time length during which the light blocking portion 27 blocks light for the light reception portion 25$b$, and the target light blocking time $t_a$ is the time length during which the light blocking portion 27 blocks light for the light reception portion 25$b$ when the mirror portion 21 is swung by the predetermined target swing angle $\theta_c$. In this way, if a swing period of the mirror portion 21 is constant, the swing of the mirror portion 21 can be controlled by acquiring the light blocking time $t_3$. As a result, compared with a configuration in which the swing angle $\theta_b$ of the mirror portion 21 is acquired and is compared with the target swing angle $\theta_c$, the processing load of the mirror control portion 230 when controlling the swing of the mirror portion 21 can be reduced.

Moreover, the other effects of the second embodiment are similar to those of the first embodiment.

Third Embodiment

A third embodiment is described with reference to FIGS. 19 and 20. In the third embodiment, different from the first embodiment in which the swing of the mirror portion 21 is controlled for each period T, an example is described in which the swing of the mirror portion 21 is controlled for each half period. Moreover, in the diagram, the same reference numerals are given to parts having the same configurations as those of the first embodiment.

Figure 19:
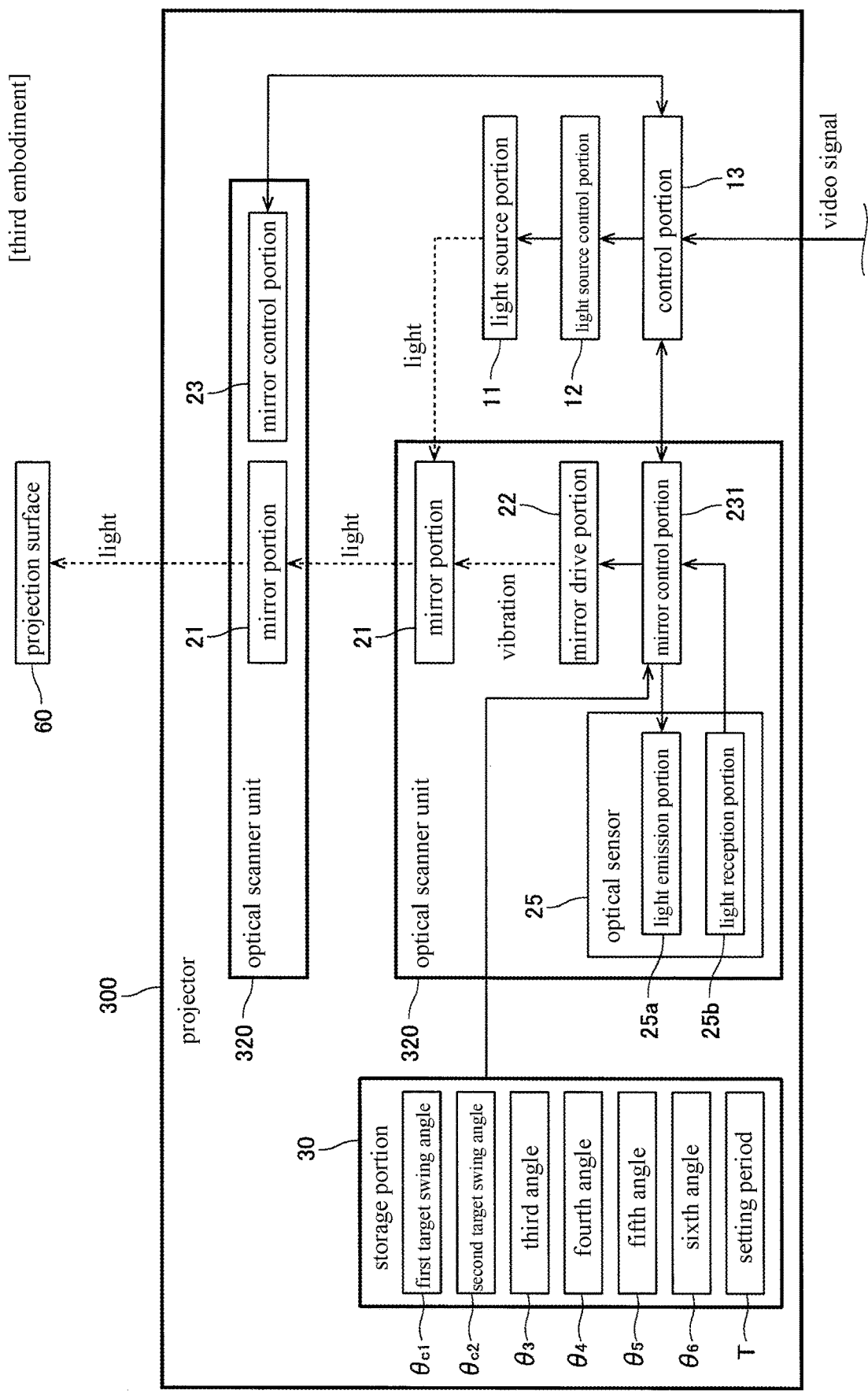
FIG. 19 is a block diagram showing an overall configuration of a projector according to a third embodiment.

As shown in FIG. 19, a projector 300 according to the third embodiment is different from the projector 100 in the first embodiment in terms that the projector 300 includes an optical scanner unit 320 instead of the optical scanner unit 20. Moreover, the projector 300 is an example of the "optical apparatus" in the claims.

The optical scanner unit 320 is different from the optical scanner unit 20 in the first embodiment in terms that the optical scanner unit 320 includes a mirror control portion 231 instead of the mirror control portion 23.

Figure 20:
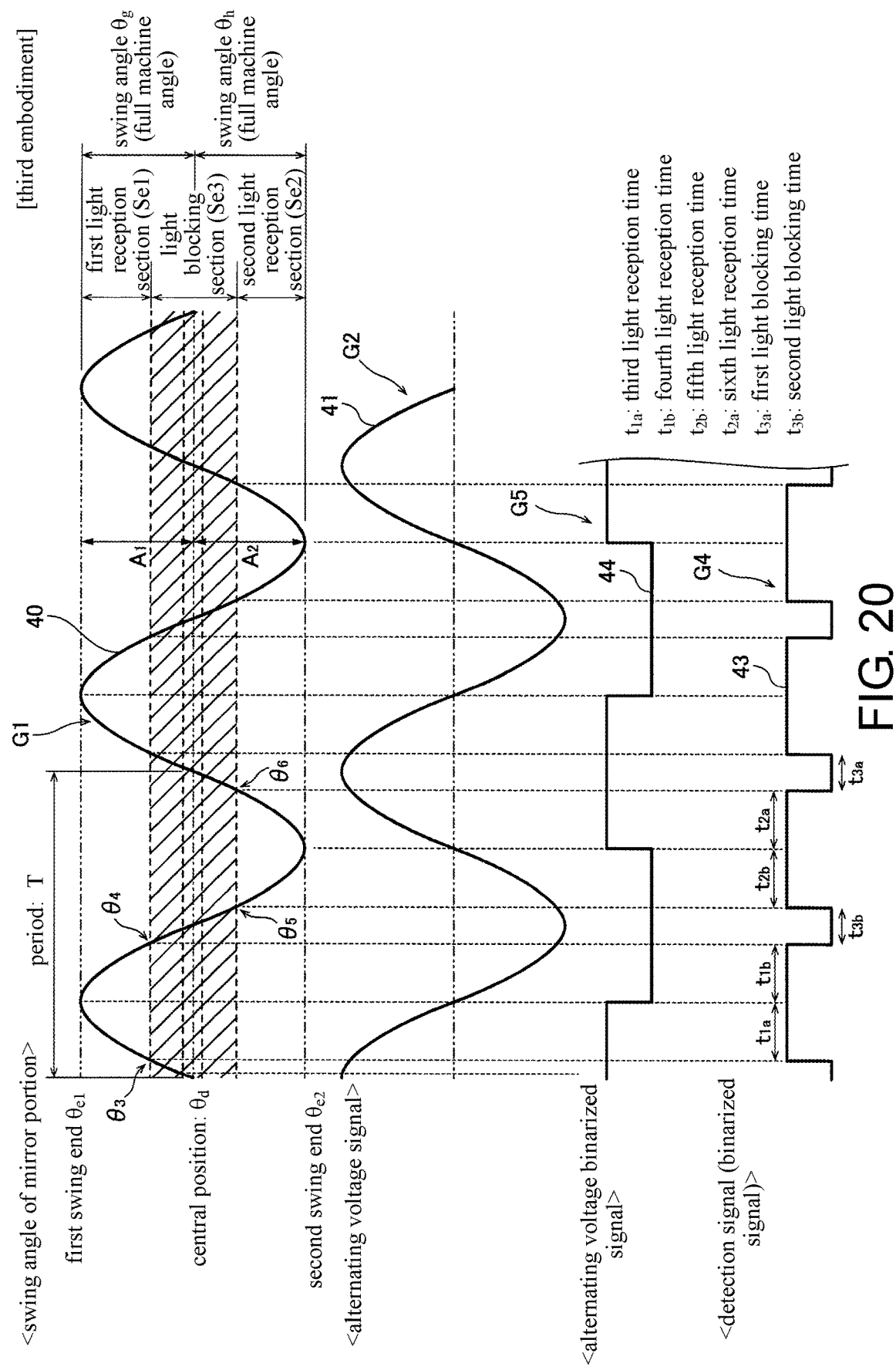
FIG. 20 is a diagram for illustrating a swing angle of a mirror, an alternating voltage signal, an alternating voltage binarized signal, and a detection signal of an optical scanner unit according to the third embodiment.

FIG. 20 shows a graph G1 showing the swing signal 40 of the mirror portion 21, a graph G2 showing the alternating voltage signal 41, a graph G5 of the alternating voltage binarized signal 44 obtained by binarizing the alternating voltage signal 41, and a graph G4 of the detection signal 43. Moreover, the graph G5 is graph in which a vertical axis represents signal intensity and a horizontal axis represents time.

The alternating voltage binarized signal 44 is a binarized signal that is in a HIGH state when the alternating voltage signal 41 is positive and is in a LOW state when the alternating voltage signal 41 is negative.

As shown in the graph G1 of FIG. 20, a third angle $\theta_3$ is an angle of the mirror portion 21 when switching from the light blocking section Se3 to the first light reception section Se1. In addition, a fourth angle $\theta_4$ is an angle of the mirror portion 21 when switching from the first light reception section Se1 to the light blocking section Se3. In addition, a fifth angle $\theta_5$ is an angle of the mirror portion 21 when switching from the light blocking section Se3 to the second light reception section Se2. In addition, a sixth angle $\theta_6$ is an angle of the mirror portion 21 when switching from the second light reception section Se2 to the light blocking section Se3.

In addition, a third light reception time $t_{1a}$ is a time length in the first light reception time $t_1$ during which the alternating voltage binarized signal 44 is in the HIGH state. In addition, a fourth light reception time $t_{1b}$ is a time length in the first light reception time $t_1$ during which the alternating voltage binarized signal 44 is in the LOW state. In addition, a fifth light reception time $t_{2b}$ is a time length in the second light reception time $t_2$ during which the alternating voltage binarized signal 44 is in the HIGH state. In addition, a sixth light reception time $t_{2a}$ is a time length in the second light reception time $t_2$ during which the alternating voltage binarized signal 44 is in the LOW state.

The mirror control portion 231 acquires the third angle $\theta_3$, the fourth angle $\theta_4$, the fifth angle $\theta_5$, and the sixth angle $\theta_6$ in advance as pre-processing based on the following formulas (9) to (12).

[Equation 7]

$$\theta_3 = \frac{\theta_a}{2}\cos\left(2\pi \times \frac{t_{1a}}{T}\right) \quad (9)$$

$$\theta_4 = \frac{\theta_a}{2}\cos\left(2\pi \times \frac{t_{1b}}{T}\right) \quad (10)$$

$$\theta_5 = -\frac{\theta_a}{2}\cos\left(2\pi \times \frac{t_{2a}}{T}\right) \quad (11)$$

$$\theta_6 = -\frac{\theta_a}{2}\cos\left(2\pi \times \frac{t_{2b}}{T}\right) \quad (12)$$

In addition, the storage unit 30 stores a predetermined first target swing angle $\theta_{c1}$ and a predetermined second target swing angle $\theta_{c2}$ which are preset by an operator. Moreover, the predetermined first target swing angle $\theta_{c1}$ and the predetermined second target swing angle $\theta_{c2}$ are examples of the "predetermined target swing angle" in the claims.

In the third embodiment, the mirror control portion 231 controls the swing of the mirror portion 21 for each half period based on the first light reception time $t_1$ or the second light reception time $t_2$ and the predetermined target swing angle $\theta_c$. Specifically, the mirror control portion 231 controls the swing of the mirror portion 21 for each half period based on the predetermined first target swing angle $\theta_{c1}$, the third light reception time $t_{1a}$, and the sixth light reception time $t_{2a}$, wherein the third light reception time $t_{1a}$ is a time length of reaching a first swing end $\theta_{e1}$ which is a swing end of the one swing angle side $A_1$ after switching from the light blocking section Se3 to the first light reception section Se1, and the sixth light reception time $t_{2a}$ is a time length of switching from a second swing end $\theta_{e2}$ to the light blocking section Se3. Moreover, the mirror control portion 231 may control the swing of the mirror portion 21 for each half period based on the predetermined second target swing angle $\theta_{c2}$, the fourth light reception time $t_{1b}$, and the fifth light reception time $t_{2b}$, wherein the fourth light reception time $t_{1b}$ is a time length of switching from the first swing end $\theta_{e1}$ to the light blocking section Se3, and the fifth light reception time $t_{2b}$ is a time length of reaching a second swing end $\theta_{e2}$ which is a swing end of the other swing angle side $A_2$ after switching from the light blocking section Se3 to the second light reception section Se2.

In the third embodiment, the mirror control portion 231 acquires, based on the following formula (13) or formula (14), a first swing angle $\theta_g$ when the light blocking portion 27 swings on the one swing angle side $A_1$ or a second swing angle $\theta_h$ when the light blocking portion 27 swings on the other swing angle side $A_2$.

[Equation 8]

$$\theta_g = \frac{2(\theta_3 - \theta_5)}{\cos\left(2\pi \times \frac{t_{1a}}{T}\right) + \cos\left(2\pi \times \frac{t_{2a}}{T}\right)} \quad (13)$$

$$\theta_h = \frac{2(\theta_4 - \theta_6)}{\cos\left(2\pi \times \frac{t_{1b}}{T}\right) + \cos\left(2\pi \times \frac{t_{2b}}{T}\right)} \quad (14)$$

In addition, the mirror control portion 231 can acquire, based on the following formula (15) or formula (16), a deviation amount $\theta_i$ of the swing angle center on the one swing angle side $A_1$ or a deviation amount $\theta_j$ of the swing angle center on the other swing angle side $A_2$.

[Equation 9]

$$\theta_i = \frac{\theta_g}{4\left\{\cos\left(2\pi \times \frac{t_{1a}}{T}\right) + \cos\left(2\pi \times \frac{t_{2a}}{T}\right)\right\}} \quad (15)$$

$$\theta_j = \frac{\theta_h}{4\left\{\cos\left(2\pi \times \frac{t_{1b}}{T}\right) + \cos\left(2\pi \times \frac{t_{2b}}{T}\right)\right\}} \quad (16)$$

Figure 21:
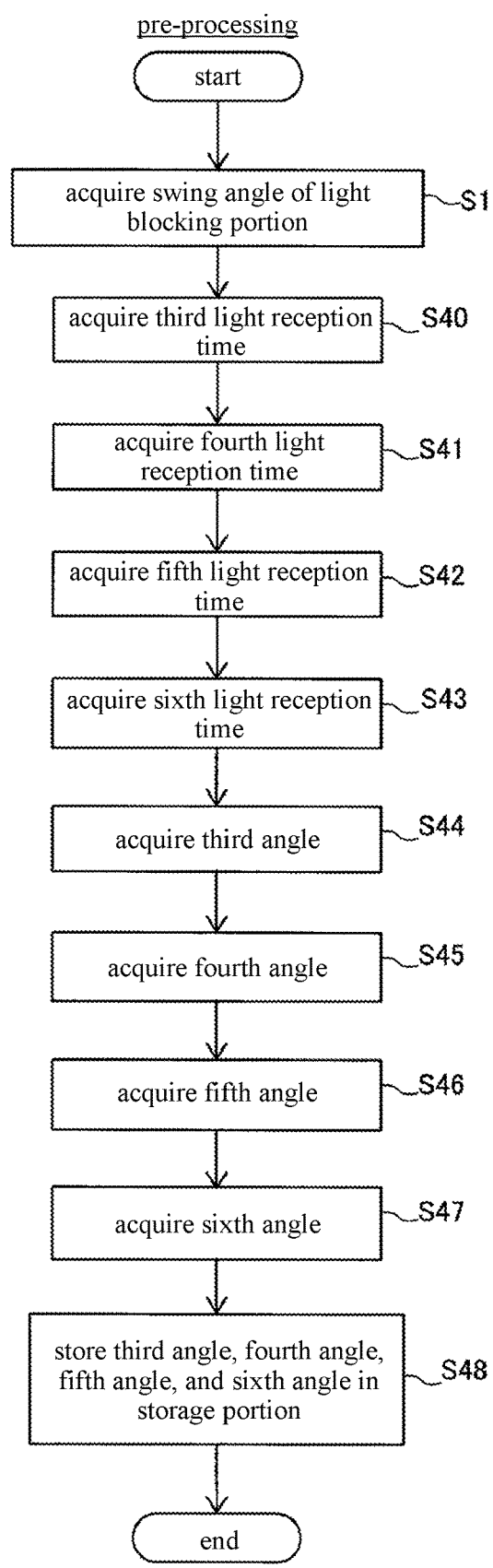
FIG. 21 is a flowchart for illustrating pre-processing performed by a mirror control portion according to the third embodiment.

Next, pre-processing performed by the mirror control portion 231 is described with reference to FIG. 21. Moreover, the same processing as that of the mirror control portion 23 according to the first embodiment described above is designated by the same reference numerals, and specific description thereof is omitted.

In step S1, the mirror control portion 231 acquires the swing angle $\theta_a$ of the light blocking portion 27.

In step S40, the mirror control portion 231 acquires the third light reception time $t_{1a}$ based on the detection signal 43 and the alternating voltage binarized signal 44.

In step S41, the mirror control portion 231 acquires the fourth light reception time $t_{1b}$ based on the detection signal 43 and the alternating voltage binarized signal 44.

In step S42, the mirror control portion 231 acquires the fifth light reception time $t_{2b}$ based on the detection signal 43 and the alternating voltage binarized signal 44.

In step S43, the mirror control portion 231 acquires the sixth light reception time $t_{2a}$ based on the detection signal 43 and the alternating voltage binarized signal 44.

In step S44, the mirror control portion 231 acquires the third angle $\theta_3$ based on the above formula (9).

In step S45, the mirror control portion 231 acquires the fourth angle $\theta_4$ based on the above formula (10).

In step S46, the mirror control portion 231 acquires the fifth angle $\theta_5$ based on the above formula (11).

In step S47, the mirror control portion 231 acquires the sixth angle $\theta_6$ based on the above formula (12).

In step S48, the mirror control portion 231 stores the third angle $\theta_3$, the fourth angle $\theta_4$, the fifth angle $\theta_5$, and the sixth angle $\theta_6$ which are acquired in the storage unit 30. Thereafter, the processing ends.

Figure 22:
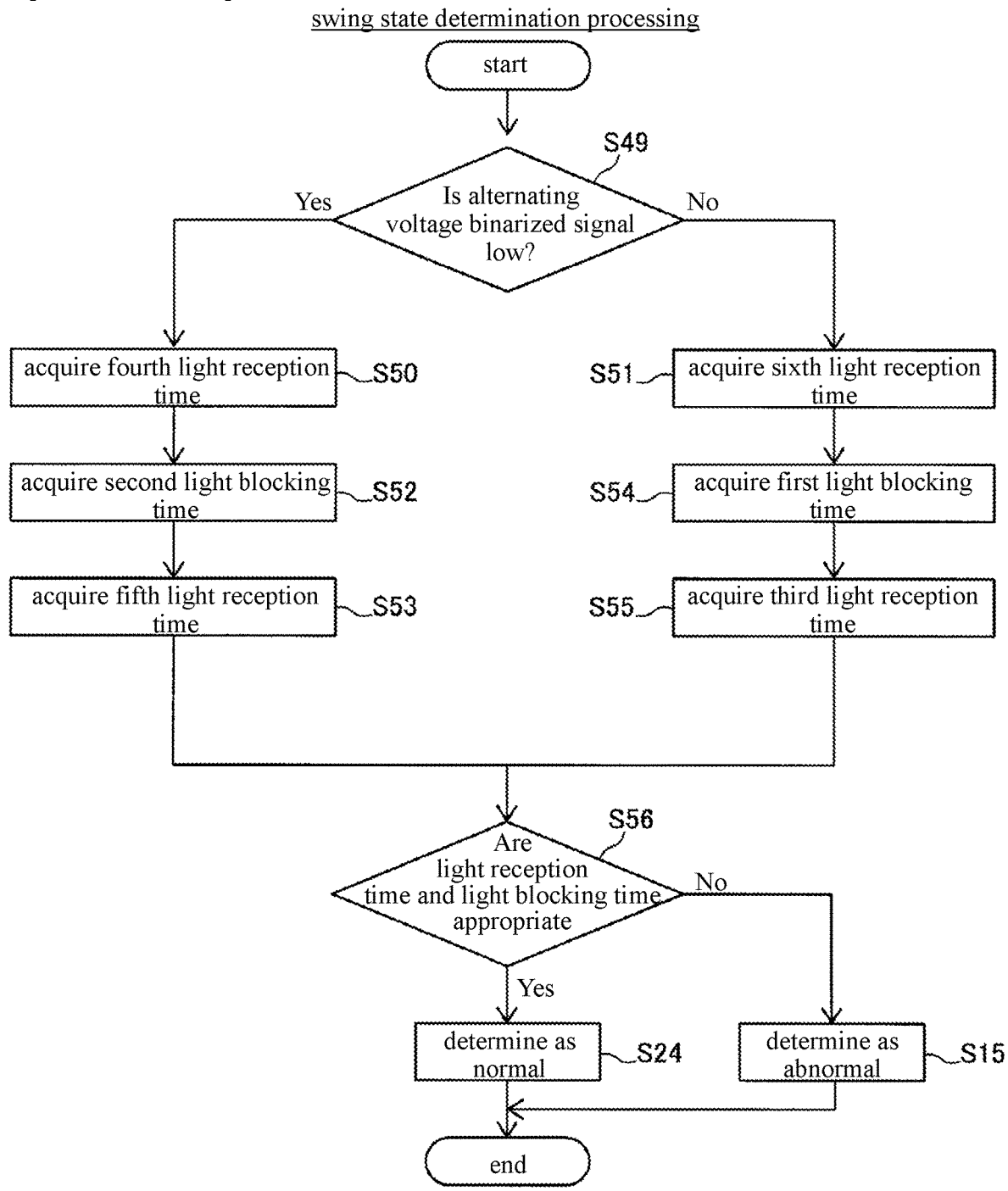
FIG. 22 is a flowchart for illustrating processing in which the mirror control portion according to the third embodiment determines a swing state of a mirror portion.

Next, processing in which the mirror control portion 231 according to the third embodiment determines the swing state of the mirror portion 21 is described with reference to FIG. 22. Moreover, in the example shown in FIG. 22, the swing state is determined every half period when the mirror portion 21 swings in the same direction. In addition, steps of performing the same processing as that of the mirror control portion 23 according to the first embodiment described above are designated by the same reference numerals, and specific description thereof is omitted.

In step S49, it is determined whether the alternating voltage binarized signal 44 is LOW when the fourth light reception time $t_{1b}$, the second light blocking time $t_{3b}$, and the fifth light reception time $t_{2b}$ are acquired. When the alternating voltage binarized signal 44 is LOW, the processing proceeds to step S50. When the alternating voltage binarized signal 44 is not LOW (when the alternating voltage binarized signal 44 is HIGH), the processing proceeds to step S51.

In step S50, the mirror control portion 231 acquires the fourth light reception time $t_{1b}$ based on the detection signal 43 and the alternating voltage binarized signal 44. Moreover, the fourth light reception time $t_{1b}$ acquired in step S50 is an actual time length during which the light block 27 reaches the light blocking section Se3 from the swing end $\theta_{e1}$ of the one swing angle side $A_1$ when the light block 27 swings during the swing control of the mirror portion 21. Next, the processing proceeds to step S52.

In step S52, the mirror control portion 231 acquires the second light blocking time $t_{3b}$ based on the alternating voltage binarized signal 44 and the detection signal 43. Moreover, the second light blocking time $t_{3b}$ acquired in step S52 is an actual time length during which the light blocking portion 27 passes through the light blocking section Se3 by the swing of the other swing angle side $A_2$ when the light blocking portion 27 swings during the swing control of the mirror portion 21.

In step S53, the mirror control portion 231 acquires the fifth light reception time $t_{2b}$ based on the detection signal 43 and the alternating voltage binarized signal 44. Moreover, the fifth light reception time $t_{2b}$ acquired in step S53 is an actual time length during which the light blocking portion 27 reaches the swing end $\theta_{e2}$ of the other swing angle side $A_2$ from the light blocking section Se3 when the light blocking portion 27 swings during the swing control of the mirror portion 21. Thereafter, the processing proceeds to step S56.

When the processing proceeds from step S49 to step S51, in step S51, the mirror control portion 231 acquires the sixth light reception time $t_{2a}$ based on the detection signal 43 and the alternating voltage binarized signal 44. Moreover, the sixth light reception time $t_{2a}$ acquired in step S51 is an actual time length during which the light blocking portion 27 reaches the light blocking section Se3 from the swing end $\theta_{e2}$ of the other swing angle side $A_2$ when the light block 27 swings during the swing control of the mirror portion 21. Thereafter, the processing proceeds to step S54.

In step S54, the mirror control portion 231 acquires the first light blocking time $t_{3a}$ based on the alternating voltage binarized signal 44 and the detection signal 43. Moreover, the first light blocking time $t_{3a}$ acquired in step S54 is an actual time length during which the light blocking portion 27 passes through the light blocking section Se3 by the swing toward the one swing angle side $A_1$ when the light blocking portion swings during the swing control of the mirror portion 21.

In step S55, the mirror control portion 231 acquires the third light reception time $t_{1a}$ based on the detection signal 43 and the alternating voltage binarized signal 44. Moreover, the third light reception time $t_{1a}$ acquired in step S55 is an actual time length during which the light blocking portion 27 reaches the swing end $\theta_{e1}$ of the one swing angle side $A_1$ from the light blocking section Se3 when the light blocking portion 27 swings during the swing control of the mirror portion 21. Thereafter, the processing proceeds to step S56.

In step S56, the mirror control portion 231 determines whether the light reception time and the light blocking time are appropriate. In the determination processing in step S56, similar to the processing in step S23, a second determination time $t_5$ is acquired based on the following formula (17) or formula (18). The mirror control portion 231 determines whether the light reception time and the light blocking time are appropriate depending on whether the acquired second determination time $t_5$ satisfies a condition of the following formula (19). When the light reception time and the light blocking time are appropriate, the processing proceeds to step S24, and then ends. When the light reception time and the light blocking time are not appropriate, the processing proceeds to step S15, and then ends.

[Equation 10]

$$t_5 = t_{3b} + t_4 + t_5 \quad (17)$$

$$t_5 = t_{3a} + t_3 + t_6 \quad (18)$$

$$0.99 \times \tfrac{1}{2} < t_5 < 1.01 \times \tfrac{1}{2}T \quad (19)$$

Figure 23:
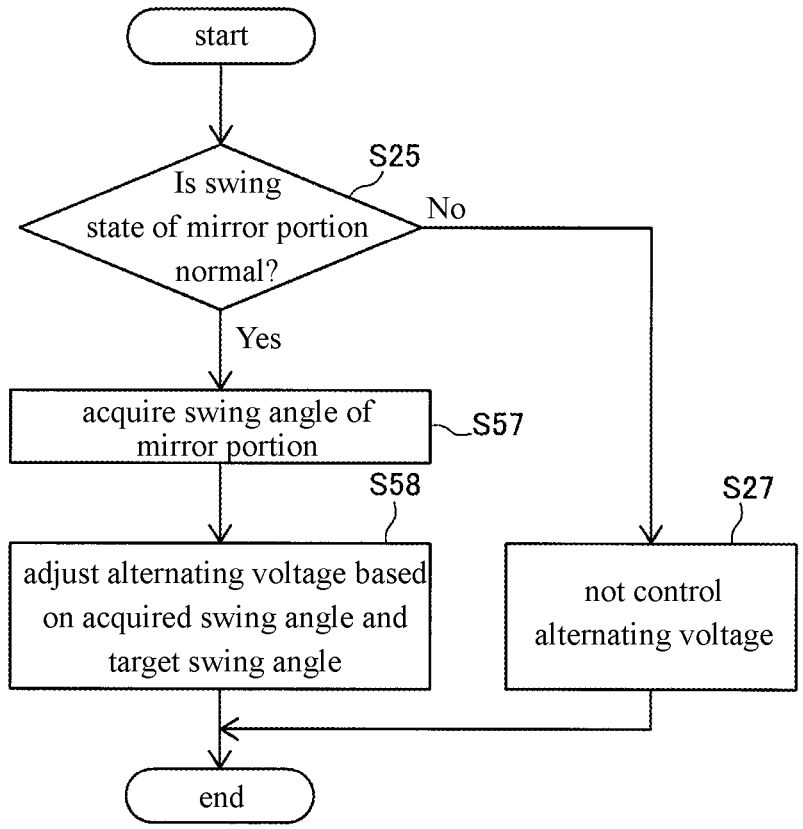
FIG. 23 is a flowchart for illustrating control of an alternating voltage performed by the mirror control portion according to the third embodiment.

Next, processing in which the mirror control portion 231 according to the third embodiment adjusts the alternating voltage is described with reference to FIG. 23. Moreover, steps of performing the same processing as that of the mirror control portion 23 according to the first embodiment described above are designated by the same reference numerals, and specific description thereof is omitted.

In step S25, the mirror control portion 231 determines whether the swing state of the mirror portion 21 is normal. When the swing state of the mirror portion 21 is normal, the processing proceeds to step S57. When the swing state of the mirror portion 21 is abnormal, the processing proceeds to step S27, and then ends.

In step S57, the mirror control portion 231 acquires the first swing angle $\theta_g$ or the second swing angle $\theta_h$ of the mirror portion 21 for each half period based on the formula (13) or the formula (14).

In step S58, the mirror control portion 231 controls the alternating voltage in order that the first swing angle $\theta_g$ becomes the first target swing angle $\theta_{c1}$, or controls the alternating voltage in order that the second swing angle $\theta_h$ becomes the second target swing angle $\theta_{c2}$. Thereafter, the processing ends.

Moreover, the other configurations of the projector 300 according to the third embodiment are the same as those of the first embodiment.

In the third embodiment, as described above, the mirror control portion 231 controls the swing of the mirror portion 21 for each half period based on the first light reception time $t_1$ or the second light reception time $t_2$ and the predetermined target swing angle $\theta_c$. In this way, the swing of the mirror portion 21 can be controlled for each half period, and thus, for example, compared with the configuration of controlling the swing of the mirror portion 21 for each period T, the swing of the mirror portion 21 can be controlled more precisely.

In addition, in the third embodiment, as described above, the mirror control portion 231 controls the swing of the mirror portion 21 for each half period based on the predetermined first target swing angle $\theta_{c1}$, the third light reception time $t_{1a}$, and the sixth light reception time $t_{2a}$, or based on the predetermined second target swing angle $\theta_{c2}$, the fourth light reception time $t_{1b}$, and the fifth light reception time $t_{2b}$, wherein the third light reception time $t_{1a}$ is the time length of reaching the first swing end $\theta_{c1}$ which is the swing end of the one swing angle side $A_1$ after switching from the light blocking section Se3 to the first light reception section Se1, the sixth light reception time $t_{2a}$ is the time length of switching from the second swing end $\theta_{e2}$ to the light blocking section Se3, the fourth light reception time $t_{1b}$ is the time length of switching from the first swing end $\theta_{e1}$ to the light blocking section Se3, and the fifth light reception time $t_{2b}$ is the time length of reaching the second swing end $\theta_{e2}$ which is the swing end of the other swing angle side $A_2$ after switching from the light blocking section Se3 to the second light reception section Se2. In this way, the swing of the mirror portion 21 can be easily controlled by acquiring the third light reception time $t_{1a}$, the fourth light reception time $t_{1b}$, the fifth light reception time $t_{2b}$, and the sixth light reception time $t_{2a}$.

Moreover, the other effects of the third embodiment are similar to those of the first embodiment.

Fourth Embodiment

A fourth embodiment is described with reference to FIGS. 24 to 26. In the fourth embodiment, an example configured to include a cover member 50 arranged to cover the optical sensor 25 is described. Moreover, in the diagram, the same reference numerals are given to parts having the same configurations as those of the first embodiment.

Figure 24:
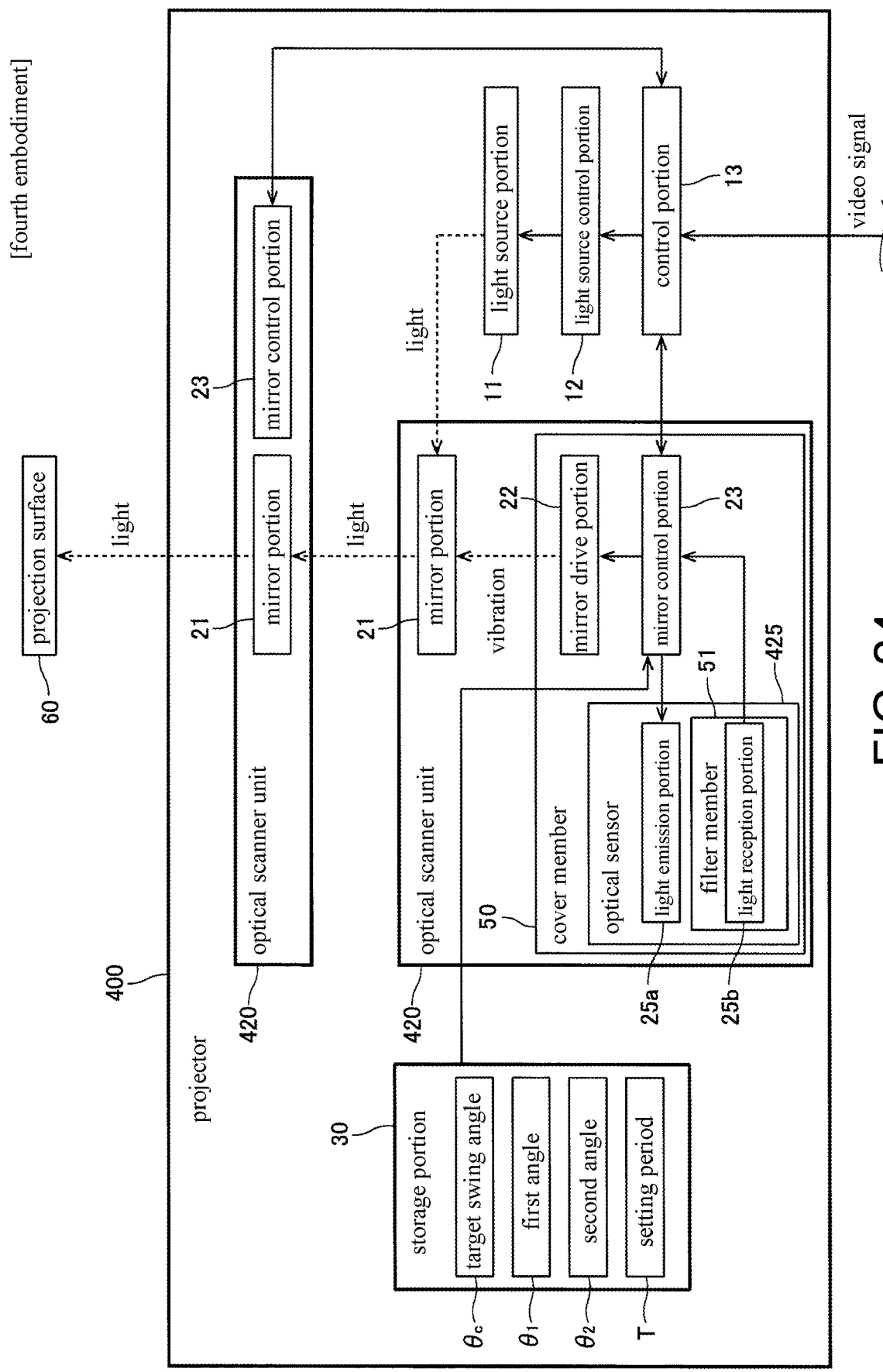
FIG. 24 is a block diagram showing an overall configuration of a projector according to a fourth embodiment.

As shown in FIG. 24, a projector 400 according to the fourth embodiment is different from the projector 100 in the first embodiment in terms that the projector 400 includes an optical scanner unit 420 instead of the optical scanner unit 20. Moreover, the projector 400 is an example of the "optical apparatus" in the claims.

In the fourth embodiment, the optical scanner unit 420 is different from the optical scanner unit 20 according to the first embodiment in terms that the optical scanner unit 420 includes the cover member 50 and an optical sensor 425. The optical sensor 425 is different from the optical sensor 25 according to the first embodiment in terms that the optical sensor 425 includes a filter member 51.

Figure 25:
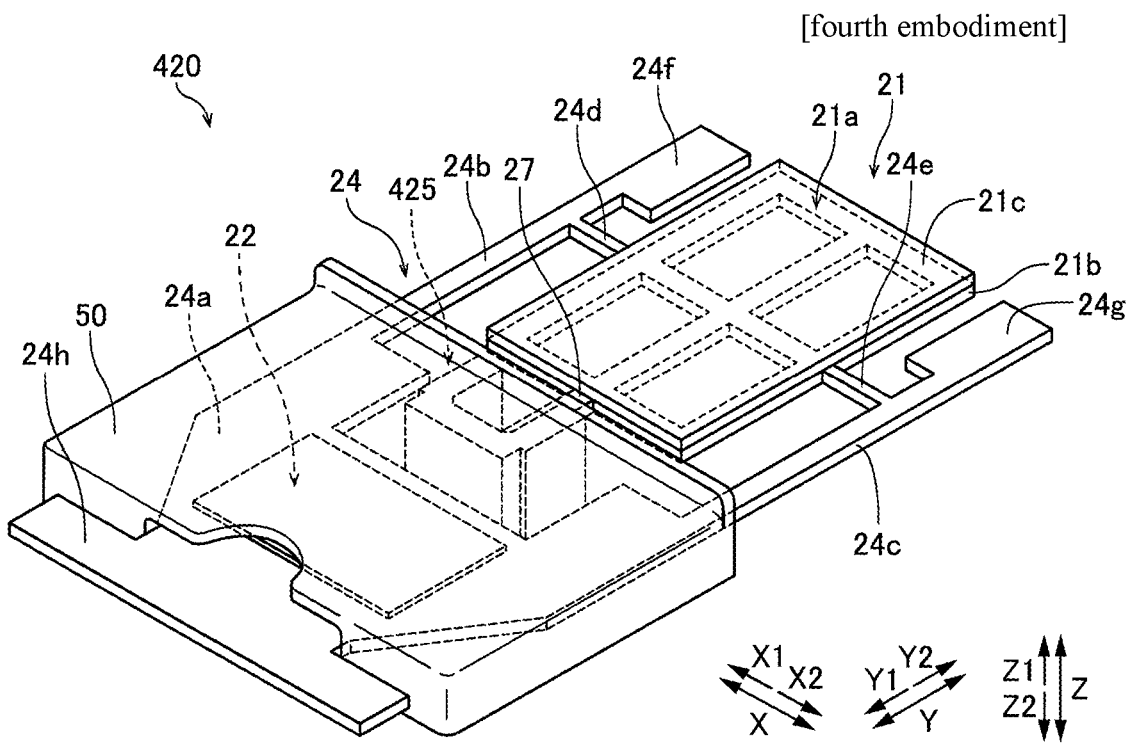
FIG. 25 is a perspective view of an optical scanner unit according to the fourth embodiment.

As shown in FIG. 25, the cover member 50 is arranged on an upper side (Z1 side) of the metal member 24 that is formed in a plate shape to cover substantially half of the metal member 24 on the Y1 side and not to cover substantially half of the metal member 24 on the Y2 side when viewed from the Z-direction. In this way, the cover member 50 covers the optical sensor 425 and the mirror drive portion 22 from the upper side (Z1 side) and does not cover the mirror portion 21 from the upper side (Z1 side). That is, the cover member 50 is arranged in a manner that scanning laser light incident on the mirror portion 21 is not blocked by the cover member 50.

Figure 26:
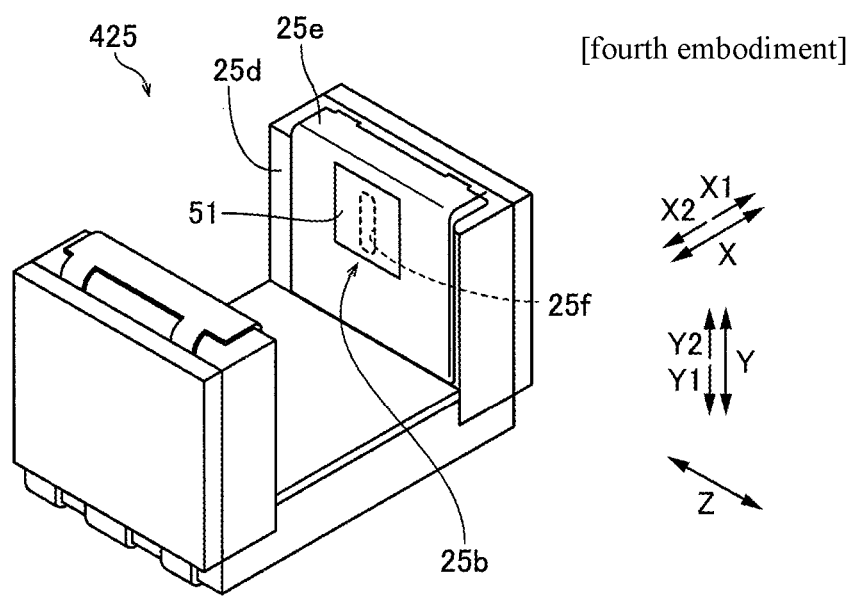
FIG. 26 is a diagram for illustrating a filter member arranged in a light reception portion of an optical sensor in the optical scanner unit according to the fourth embodiment.

In addition, as shown in FIG. 26, the optical sensor 425 includes the filter member 51 arranged in the vicinity of the light reception portion 25b in a manner that light incident on the light reception portion 25b passes through the filter member 51. The filter member 51 enables light in a wavelength region corresponding to the light emitted by the light emission portion 25a to pass through.

Moreover, the other configurations of the projector 400 according to the fourth embodiment are the same as those of the first embodiment.

In the fourth embodiment, as described above, the optical scanner unit 420 includes the cover member 50 arranged to cover the optical sensor 425. In this way, in the optical sensor 425 covered by the cover member 50, disturbance light such as stray light (unnecessary reflected light) generated in the optical scanner unit 420, light incident from the outside of the optical scanner unit 420, or the like is suppressed from being incident, and thus, detection precision of the swing angle $\theta_b$ of the mirror portion 21 based on the light incident on the light reception portion 25b can be prevented from decreasing due to the disturbance light.

In addition, in the fourth embodiment, as described above, the optical scanner unit 420 includes the filter member 51 which is arranged in the vicinity of the light reception portion 25b in a manner that light incident on the light reception portion 25b passes through the filter member 51, and which enables light in the wavelength region corresponding to the light emitted by the light emission portion 25a to pass through. In this way, in the light reception portion 25b equipped with the filter member 51 in the vicinity, light other than the wavelength region corresponding to the light emitted by the light emission portion 25a is prevented from being incident, and thus, the detection precision of the swing angle $\theta_b$ of the mirror portion 21 based on the light incident on the light reception portion 25b can be prevented from decreasing due to the disturbance light such as stray light (unnecessary reflected light) generated in the optical scanner unit 420, light incident from the outside of the optical scanner unit 420, or the like.

Moreover, the other effects of the fourth embodiment are similar to those of the first embodiment.

Variation Example

Moreover, it should be considered that the embodiments disclosed this time are exemplifications in all points and not restrictive. The scope of the disclosure is shown not by the above description of the embodiments but by the claims, and further includes meanings equivalent to the claims and all modifications (variation examples) within the scope.

For example, in the above-described first to third embodiments, the example of the configuration is shown in which the case where the alternating voltage signal 41 becomes zero from the negative side is set as the zero cross, and the position of the mirror portion 21 at that time is the swing end of the other swing angle side $A_2$, but the disclosure is not limited hereto. For example, a case where the alternating voltage signal 41 becomes zero from the positive side may be set as a zero cross, and a position of the mirror portion 21 at that time may be the swing end of the one swing angle side $A_1$. When the zero cross and the swing direction of the mirror portion 21 are set in advance, either the case of becoming zero from the positive side or the case of becoming zero from the negative side may be the zero cross.

In addition, in the first, second, and fourth embodiments described above, the examples of the configurations are shown in which the mirror control portion 23 (230) controls the swing of the mirror portion 21 for each period T, and in the third embodiment, the mirror control portion 231 controls the swing of the mirror portion 21 for each half period, but the disclosure is not limited hereto. For example, the mirror control portion 23 (230, 231) may combine the swing of the mirror portion 21 with the control for each period T and the control for each half period. In addition, the mirror control portion 23 (230) may be configured to control the swing of the mirror portion 21 every several periods.

In addition, in the third embodiment, the example of the configuration is shown in which the mirror control portion 231 controls the alternating voltage based on the comparison of the first swing angle $\theta_g$ and the predetermined first target swing angle $\theta_{c1}$ or the comparison of the second swing angle $\theta_h$ and the predetermined second target swing angle $\theta_{c2}$, but the disclosure is not limited hereto. For example, the mirror control portion 231 may acquire a first target light blocking time $t_{b1}$ or a second target light blocking time $t_{b2}$ based on the following formulas (20) and (21), and control the alternating voltage based on comparison of the first light blocking time $t_{3a}$ and the first target light blocking time $t_{b1}$ or comparison of the second light blocking time $t_{3b}$ and the second target light blocking time $t_2$.

[Equation 11]

$$t_{b1} = \frac{T}{2} - \frac{t_{1a}}{4} - \frac{t_{2a}}{4} - \frac{T}{4n\left[\arccos\left\{\frac{2(\theta_3 - \theta_5)}{\theta_c} - \cos\left(2\pi \times \frac{t_{1a}}{T}\right)\right\} + \arccos\left\{\frac{2(\theta_3 - \theta_5)}{\theta_c} - \cos\left(2\pi \times \frac{t_{2a}}{T}\right)\right\}\right]} \quad (20)$$

$$t_{b2} = \frac{T}{2} - \frac{t_{1b}}{4} - \frac{t_{2b}}{4} - \frac{T}{4n\left[\arccos\left\{\frac{2(\theta_4 - \theta_6)}{\theta_c} - \cos\left(2\pi \times \frac{t_{1b}}{T}\right)\right\} + \arccos\left\{\frac{2(\theta_4 - \theta_6)}{\theta_c} - \cos\left(2\pi \times \frac{t_{2b}}{T}\right)\right\}\right]} \quad (21)$$

In addition, in the above-described first to fourth embodiments, the example is shown in which the optical sensor 25 is arranged between the mirror portion 21 and the mirror drive portion 22, but the disclosure is not limited hereto. In the disclosure, the optical sensor may not be arranged between the mirror portion and the mirror drive portion.

In addition, in the above-described first to fourth embodiments, the example is shown in which the optical sensor 25 (425) is configured as a sensor (a photo interrupter) which determines the presence or the position of an object by the light reception portion 25b detecting that the light emitted from the light emission portion 25a is blocked by the object, but the disclosure is not limited hereto. In the disclosure, the optical sensor may be configured as a sensor (photo reflector) which determines the presence or the position of an object by detecting the light emitted from the light emission portion and incident and reflected on the object.

In addition, in the above-described first to fourth embodiments, the example is shown in which the mirror control portion 23 (230, 231) performs control by the PID control in order that the mirror portion 21 reaches the target swing angle $\theta_c$, but the disclosure is not limited hereto. In the disclosure, the mirror control portion 23 (230, 231) may perform control by feedback control other than the PID control in order that the mirror portion 21 reaches the target swing angle $\theta_c$.

In addition, in the above-described first to fourth embodiments, the example is shown in which the mirror portion 21 includes the mirror substrate 21a and the mirror substrate support portion 21b which is apart of the metal member 24, but the disclosure is not limited hereto. In the disclosure, the mirror portion may not include the mirror substrate. In this case, surface processing for improving reflectance of light is performed on the mirror substrate support portion which is a part of the metal member.

In addition, in the above-described first to fourth embodiments, the example is shown in which the "optical apparatus" of the disclosure is applied to the projector 100 (200, 300, 400), but the disclosure is not limited hereto. The "optical apparatus" of the disclosure may be applied to an "optical apparatus" other than a projector such as a lighting device or the like.

What is claimed is:

1. An optical scanner unit, comprising:
   a mirror portion comprising a reflection part which reflects light;
   a vibration generation portion which causes the mirror portion to swing around a predetermined swing axis by applying an alternating voltage;
   a single optical sensor comprising a single light emission portion and a single light reception portion which receives light emitted from the single light emission portion;
   a light blocking portion which is arranged in the mirror portion to swing together with the swing of the mirror portion and periodically blocks the light emitted from the single light emission portion along with the swing; and
   a control portion which controls the swing of the mirror portion based on the alternating voltage and a detection signal of the single optical sensor, wherein
   the control portion acquires a state of the swing of the mirror portion based on a light reception state of the single light reception portion and a zero-cross timing of the alternating voltage, and controls the swing of the mirror portion.

2. The optical scanner unit according to claim 1, wherein the control portion acquires the state of the swing of the mirror portion based on a first light reception section, a second light reception section, and the zero-cross timing, and controls the swing of the mirror portion, wherein the first light reception section is a section in which the light blocking portion swings not to block the single light reception portion on one swing angle side, and the second light reception section is a section in which the light blocking portion swings not to block the single light reception portion on the other swing angle side.

3. The optical scanner unit according to claim 2, wherein the control portion acquires a first light reception time and a second light reception time, and controls the swing of the mirror portion based on the acquired first light reception time, the acquired second light reception time, and a predetermined target swing angle, wherein the first light reception time is a time length during which the light blocking portion swings in the first light reception section, and the second light reception time is a time length during which the light blocking portion swings in the second light reception section.

4. The optical scanner unit according to claim 3, wherein the control portion acquires the first light reception time based on a timing of switching from a light blocking section to the first light reception section and a timing of switching from the first light reception section to the light blocking section, and the control portion acquires the second light reception time based on a timing of switching from the light blocking section to the second light reception section and a timing of switching from the second light reception section to the light blocking section, wherein the light blocking section is a section in which the light blocking portion swings to block the single light reception portion.

5. The optical scanner unit according to claim 4, wherein the control portion acquires a first angle based on the first light reception time, acquires a second angle based on the second light reception time, acquires a swing angle of the mirror portion according to the acquired first angle, the acquired second angle, the first light reception time, and the second light reception time, and controls the swing angle of the mirror portion by comparing the acquired swing angle of the mirror portion with the predetermined target swing angle, wherein the first angle is a swing angle of the light blocking portion at a timing when the first light reception section and the light blocking section are switched, and the second angle is a swing angle of the light blocking portion at a timing when the second light reception section and the light blocking section are switched.

6. The optical scanner unit according to claim 5, wherein the control portion detects whether the swing of the mirror portion is normal based on the first light reception section, the second light reception section, and the zero-cross timing.

7. The optical scanner unit according to claim 4, wherein the control portion acquires a first light blocking time and a second light blocking time, acquires a light blocking time based on the acquired first light blocking time and the acquired second light blocking time, and controls the swing of the mirror portion by comparing the acquired light blocking time and a target light blocking time, wherein the first light blocking time is a time length during which the light blocking portion passes through the light blocking section by swinging toward the other swing angle side, the second light blocking time is a time length during which the light blocking portion passes through the light blocking section by swinging toward the one swing angle side, the light blocking time is a time length during which the light blocking portion blocks light for the single light reception portion, and the target light blocking time is a time length during which the light blocking portion blocks light for the single light reception portion when the mirror portion is swung by the predetermined target swing angle.

8. The optical scanner unit according to claim 7, wherein the control portion detects whether the swing of the mirror portion is normal based on the first light reception section, the second light reception section, and the zero-cross timing.

9. The optical scanner unit according to claim 4, wherein the control portion detects whether the swing of the mirror portion is normal based on the first light reception section, the second light reception section, and the zero-cross timing.

10. The optical scanner unit according to claim 4, wherein the control portion controls the swing of the mirror portion for each half period based on the first light reception time or the second light reception time and the predetermined target swing angle.

11. The optical scanner unit according to claim 10, wherein the control portion controls the swing of the mirror portion for each half period based on the predetermined target swing angle, a third light reception time, and a sixth light reception time, or based on the predetermined target swing angle, a fourth light reception time, and a fifth light reception time, wherein the third light reception time is a time length of reaching a first swing end that is a swing end on the one swing angle side after switching from the light blocking section to the first light reception section, the sixth light reception time is a time length until switching from a second swing end that is a swing end on the other swing angle side to the light blocking section, the fourth light reception time is a time length until switching from the first swing end to the light blocking section, and the fifth light reception time is a time length of reaching the second swing end after switching from the light blocking section to the second light reception section.

12. The optical scanner unit according to claim 3, wherein the control portion detects whether the swing of the mirror portion is normal based on the first light reception section, the second light reception section, and the zero-cross timing.

13. The optical scanner unit according to claim 12, wherein the control portion determines that the swing of the mirror portion is normal when the zero-cross timing is in the second light reception section, and determines that the swing of the mirror portion is abnormal when the zero-cross timing is in the first light reception section.

14. The optical scanner unit according to claim 3, wherein the control portion controls the swing of the mirror portion for each period based on the first light reception time, the second light reception time, and the predetermined target swing angle.

15. The optical scanner unit according to claim 1, wherein the single light reception portion is arranged at a position overlapping a position where the swing angle of the light blocking portion is 0 degree when the alternating voltage is not applied.

16. The optical scanner unit according to claim 1, further comprising a cover member arranged to cover the single optical sensor.

17. The optical scanner unit according to claim 1, further comprising a filter member which is arranged in the vicinity of the single light reception portion in a manner that light incident on the single light reception portion passes through the filter member, and enables light in a wavelength region corresponding to the light emitted by the single light emission portion to pass through.

18. The optical scanner unit according to claim 1, wherein the single optical sensor is arranged between the mirror portion and the vibration generation portion.

19. The optical scanner unit according to claim 1, wherein the light blocking portion protrudes from the mirror portion toward the single optical sensor side along a surface direction in which a surface of the reflection part extends, and
   the light blocking portion has a thickness smaller than a thickness of the mirror portion in a direction orthogonal to the surface direction in which the surface extends.

20. An optical apparatus, comprising:
   the optical scanner unit according to claim 1; and
   a light source portion which irradiates scanning light to the reflection part of the mirror portion equipped in the optical scanner unit.

* * * * *